United States Patent
Yamaguchi et al.

(10) Patent No.: US 10,309,328 B2
(45) Date of Patent: Jun. 4, 2019

(54) EXHAUST EMISSION CONTROL SYSTEM OF ENGINE

(71) Applicant: Mazda Motor Corporation, Aki-gun, Hiroshima (JP)

(72) Inventors: Takayuki Yamaguchi, Hatsukaichi (JP); Takashi Tanaka, Higashihiroshima (JP); Kota Matsue, Higashihiroshima (JP); Hiroshi Hayashibara, Hiroshima (JP); Yoshiaki Tomita, Hiroshima (JP); Kaoru Yamada, Hiroshima (JP); Masayuki Tetsuno, Hiroshima (JP); Daishi Ikeda, Hatsukaichi (JP); Kazunori Hirasawa, Aki-gun (JP); Masanobu Kanno, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 83 days.

(21) Appl. No.: 15/644,438

(22) Filed: Jul. 7, 2017

(65) Prior Publication Data
US 2018/0017003 A1 Jan. 18, 2018

(30) Foreign Application Priority Data
Jul. 12, 2016 (JP) .................................. 2016-137855

(51) Int. Cl.
*F01N 3/08* (2006.01)
*F01N 3/20* (2006.01)
(Continued)

(52) U.S. Cl.
CPC ....... *F02D 41/0275* (2013.01); *F01N 3/0814* (2013.01); *F01N 3/0842* (2013.01);
(Continued)

(58) Field of Classification Search
CPC .... F01N 3/0814; F01N 3/0842; F01N 3/2066; F01N 9/00; F01N 2430/06;
(Continued)

(56) References Cited

U.S. PATENT DOCUMENTS

2002/0194837 A1* 12/2002 Fluga ................... F01N 3/2006 60/284
2008/0307772 A1 12/2008 Kawamura et al.
(Continued)

FOREIGN PATENT DOCUMENTS

JP H1150884 A 2/1999
JP 2004360593 A 12/2004
(Continued)

*Primary Examiner* — Brandon D Lee
(74) *Attorney, Agent, or Firm* — Alleman Hall Creasman & Tuttle LLP

(57) ABSTRACT

An exhaust emission control system of an engine is provided, which includes a $NO_x$ catalyst disposed in an exhaust passage for storing $NO_x$ within exhaust gas when an air-fuel ratio of the exhaust gas is lean, and reducing the stored $NO_x$ when the air-fuel ratio is approximately stoichiometric or rich. A processor executes a $NO_x$ reduction controlling module for performing, when the $NO_x$ stored amount exceeds a given amount, a $NO_x$ reduction control in which a fuel injector performs a post injection of fuel to continuously control the air-fuel ratio to a target ratio so that the stored $NO_x$ is reduced to be below a given amount, the target air-fuel ratio being a ratio at which the stored $NO_x$ is reducible, the post injection causing the injected fuel to combust inside a cylinder, the execution of the control permitted when an engine load is within a medium load range.

8 Claims, 11 Drawing Sheets

(51) Int. Cl.
*F01N 9/00* (2006.01)
*F02D 41/00* (2006.01)
*F02D 41/02* (2006.01)
*F02D 41/10* (2006.01)
*F02D 41/14* (2006.01)
*F02D 41/40* (2006.01)

(52) U.S. Cl.
CPC ............ *F01N 3/2066* (2013.01); *F01N 9/00* (2013.01); *F02D 41/0055* (2013.01); *F02D 41/10* (2013.01); *F02D 41/1454* (2013.01); *F02D 41/1461* (2013.01); *F02D 41/405* (2013.01); *F01N 2430/06* (2013.01); *F01N 2560/026* (2013.01); *F01N 2570/14* (2013.01); *F01N 2610/02* (2013.01); *F01N 2900/0416* (2013.01); *F01N 2900/08* (2013.01); *F01N 2900/1614* (2013.01); *F02D 2200/0802* (2013.01); *F02D 2200/0806* (2013.01); *F02D 2200/602* (2013.01); *F02D 2250/36* (2013.01); *Y02A 50/2325* (2018.01); *Y02A 50/2344* (2018.01); *Y02T 10/24* (2013.01); *Y02T 10/44* (2013.01); *Y02T 10/47* (2013.01)

(58) Field of Classification Search
CPC ........... F01N 2560/026; F01N 2570/14; F01N 2610/02; F01N 2900/0416; F01N 2900/08; F01N 2900/1614; F02D 41/0055; F02D 41/0275; F02D 41/10; F02D 41/1454; F02D 41/1461; F02D 41/405; F02D 2200/0802; F02D 2200/0806; F02D 2200/602; F02D 2250/36

See application file for complete search history.

(56) References Cited

U.S. PATENT DOCUMENTS

2015/0143798 A1 5/2015 Lee
2015/0211427 A1 7/2015 Yasui et al.

FOREIGN PATENT DOCUMENTS

| | | |
|---|---|---|
| JP | 2007051605 A | 3/2007 |
| JP | 2008309080 A | 12/2008 |
| JP | 2010031703 A | 2/2010 |
| JP | 2010084615 A | 4/2010 |
| JP | 2015102088 A | 6/2015 |
| WO | 2014013553 A1 | 1/2014 |

* cited by examiner

EXHAUST EMISSION CONTROL SYSTEM OF ENGINE

BACKGROUND

The present invention relates to an exhaust emission control system of an engine, and particularly to an exhaust emission control system which is provided on an exhaust passage with a $NO_x$ catalyst which purifies $NO_x$ in exhaust gas.

Conventionally, $NO_x$ storage catalysts which store (occlude) $NO_x$ contained in exhaust gas when an air-fuel ratio of the exhaust gas is lean (i.e., $\lambda>1$, larger than a theoretical air-fuel ratio) are known. Such $NO_x$ storage-reduction catalysts further reduce the stored $NO_x$ when the air-fuel ratio is approximately equal to stoichiometric (i.e., $\lambda\approx1$, approximately equal to the theoretical air-fuel ratio) or is rich (i.e., $\lambda<1$, smaller than the theoretical air-fuel ratio). Within a normal operating range of an engine, the engine is operated at the lean air-fuel ratio ($\lambda>1$) so as to reduce fuel consumption, although if this lean operation state continues for a while, the $NO_x$ stored amount in the $NO_x$ catalyst reaches a limit value and the $NO_x$ catalyst can no longer store $NO_x$, which causes $NO_x$ to be released. For this reason, the air-fuel ratio is suitably set to be stoichiometric or richer ($\lambda\leq1$) in order to reduce $NO_x$ stored in the $NO_x$ catalyst (hereinafter, the control for reducing $NO_x$ stored in the $NO_x$ catalyst is referred to as "$NO_x$ reduction control"). Note that "$\lambda$" is an index of the air-fuel ratio expressed with reference to the theoretical air-fuel ratio, and is a so-called air excess ratio.

For example, JP2004-360593A discloses an art for executing, when a $NO_x$ stored amount in a $NO_x$ catalyst exceeds a given amount, a fuel injection control to enrich an air-fuel ratio of exhaust gas so as to reduce the $NO_x$ stored in the $NO_x$ catalyst.

One example of setting methods of an air-fuel ratio of exhaust gas so that $NO_x$ stored in a $NO_x$ catalyst becomes reducible (hereinafter, this air-fuel ratio is referred to as "target air-fuel ratio") is performing a post injection after a main injection. In the main injection, fuel is injected into a cylinder so as to output a desirable engine torque, and in the post injection, fuel is injected at a timing so that the engine torque output is not influenced (typically, on expansion stroke). The fuel injected in the post injection typically needs to be combusted inside the cylinder in order to perform the reduction of the $NO_x$ catalyst, otherwise unburned fuel is discharged and degrades emission performance of HC (hydrocarbon), etc.

However, depending on the operating state of the engine, combusting the fuel injected in the post injection of the $NO_x$ reduction control inside the cylinder causes smoke (soot) or HC. For example, within a high engine load range, an in-cylinder temperature rises and the fuel injected in the post injection is ignited without sufficient time from the injection, i.e., combustion occurs before air and fuel are properly mixed, and thus smoke may be generated. On the other hand, within a low engine load range, even if the fuel injected in the post injection is to be combusted, since the in-cylinder temperature is low and combustion stability is low, the injected fuel may not properly be combusted, i.e., misfire may occur. In this case, HC corresponding to unburned fuel is generated. Further, within the low engine load range, since the temperature of the $NO_x$ catalyst is low, even if the air-fuel ratio is controlled to the target air-fuel ratio, reduction of the $NO_x$ catalyst may not be performed adequately.

SUMMARY

The present invention is made in view of solving the issues of the conventional arts described above, and aims to suitably determine whether to perform, by an exhaust emission control system of an engine, a $NO_x$ reduction control in which a post injection is performed to achieve a target air-fuel ratio at which $NO_x$ stored in a $NO_x$ catalyst is reducible, based on an operating range of the engine.

According to one aspect of the present invention, an exhaust emission control system of an engine is provided, which includes a $NO_x$ catalyst disposed in an exhaust passage of the engine for storing $NO_x$ within exhaust gas when an air-fuel ratio of the exhaust gas is lean, and reducing the stored $NO_x$ when the air-fuel ratio is approximately stoichiometric or rich. The system comprises a processor configured to execute a $NO_x$ reduction controlling module for performing, when the $NO_x$ stored amount in the $NO_x$ catalyst exceeds a given determination amount, a first $NO_x$ reduction control in which a fuel injector performs a post injection of fuel to continuously control the air-fuel ratio to a target air-fuel ratio so that the stored $NO_x$ is reduced and the $NO_x$ stored amount falls below a given amount, the target air-fuel ratio being a ratio at which the stored $NO_x$ is reducible, the post injection causing the injected fuel to combust inside a cylinder, the performance of the first $NO_x$ reduction control permitted when an engine load is within a medium load range.

With this configuration, since the first $NO_x$ reduction control is performed only within the medium load range, it is suitably prevented that smoke and HC are generated due to the first $NO_x$ reduction control being executed outside the medium load range and the combustion of the post-injected fuel in this $NO_x$ reduction control.

For example, within a high load range, smoke may be generated when the post-injected fuel is combusted inside the cylinder. According to this configuration, since the first $NO_x$ reduction control is prohibited within such a high load range, smoke generation is suitably prevented. Within a low load range, although the post-injected fuel may not suitably be combusted and generate HC, according to this configuration, since the first $NO_x$ reduction control is prohibited within such a low load range, HC generation is suitably prevented. In addition, within the low load range, although the reduction of the $NO_x$ catalyst may not suitably be performed due to a low $NO_x$ catalyst temperature, according to this configuration, the first $NO_x$ reduction control is prohibited to prevent unnecessary post injection.

The $NO_x$ reduction controlling module may permit the performance of the first $NO_x$ reduction control when an engine speed is within a medium speed range.

With this configuration, since the first $NO_x$ reduction control is executed within the medium speed range, it is suitably prevented that smoke and HC are generated due to the first $NO_x$ reduction control being executed outside the medium speed range and the combustion of the post-injected fuel in this $NO_x$ reduction control.

The $NO_x$ reduction controlling module may suspend the first $NO_x$ reduction control when the engine load moves outside the medium load range, and resume the first $NO_x$ reduction control when the engine load re-enters the medium load range so that a $NO_x$ stored amount falls below the given amount.

With this configuration, the performance of the first $NO_x$ reduction control is suitably secured so that the $NO_x$ stored amount falls below the given amount.

When a temperature of the $NO_x$ catalyst is above a given value, the $NO_x$ reduction controlling module may expand the medium load range toward a higher load side by raising a load defining a higher end of the medium load range.

With this configuration, when the $NO_x$ catalyst temperature is comparatively high, a situation in which the first $NO_x$ reduction control is interrupted and thus $NO_x$ is removed from the $NO_x$ catalyst and released during the interruption is prevented.

When the $NO_x$ stored amount is above a given value, the $NO_x$ reduction controlling module may expand the medium load range toward the higher load side by raising the load value defining the higher end of the medium load range.

With this configuration, when the $NO_x$ stored amount is comparatively large, a situation in which the first $NO_x$ reduction control is interrupted and thus $NO_x$ is removed from the $NO_x$ catalyst and released during the interruption is prevented.

When the temperature of the $NO_x$ catalyst is above a given value, the $NO_x$ reduction controlling module may expand the medium speed range toward a higher speed side by raising a speed value defining a higher end of the medium speed range.

With this configuration, when the $NO_x$ catalyst temperature is comparatively high, a situation in which the first $NO_x$ reduction control is interrupted and thus $NO_x$ is removed from the $NO_x$ catalyst and released during the interruption is prevented.

When the $NO_x$ stored amount is above a given value, the $NO_x$ reduction controlling module may expand the medium speed range to the higher speed side by raising the speed value defining the higher end of the medium speed range.

With this configuration, when the $NO_x$ stored amount is comparatively large, a situation in which the first $NO_x$ reduction control is interrupted and thus $NO_x$ is removed from the $NO_x$ catalyst and released during the interruption is prevented.

When the $NO_x$ stored amount in the $NO_x$ catalyst is below the determination amount and the air-fuel ratio becomes rich due to acceleration of a vehicle, the $NO_x$ reduction controlling module may also perform a second $NO_x$ reduction control in which the fuel injector performs the post injection to temporarily control the air-fuel ratio to the target air-fuel ratio so that the $NO_x$ stored in the $NO_x$ catalyst is reduced, the post injection causing the injected fuel to be discharged to the exhaust passage as unburned fuel without being combusted inside the cylinder, the performance of the second $NO_x$ reduction control permitted only when the engine load is within a high load range above the load defining the higher end of the medium load range.

With this configuration, within the high load range above the load defining the higher end of the medium load range, the second $NO_x$ reduction control in which the post-injected fuel is discharged as unburned fuel without being combusted inside the cylinder is executed. Thus, smoke generation due to the post-injected fuel being combusted within the high load range is suitably prevented while ensuring execution of $NO_x$ reduction control within the high load range.

The system may further include a selective catalytic reduction (SCR) catalyst disposed in the exhaust passage for purifying $NO_x$ within the exhaust gas by causing a reaction with ammonia. The SCR catalyst may purify $NO_x$ within an engine operating range where the $NO_x$ reduction controlling module does not perform the post injection by the fuel injector to reduce the stored $NO_x$.

With this configuration, within the range where the first and second NO reduction controls are not performed, NO within the exhaust gas is suitably purified by the SCR catalyst. Thus, emission performance is improved.

DETAILED DESCRIPTION OF EMBODIMENT

Hereinafter, an exhaust emission control system of an engine according to one embodiment of the present invention is described with reference to the accompanying drawings.

<System Configuration>

First, an engine system to which the exhaust emission control system of the engine of this embodiment is applied is described with reference to a schematic configuration view of the engine system in FIG. 1.

Figure 1:
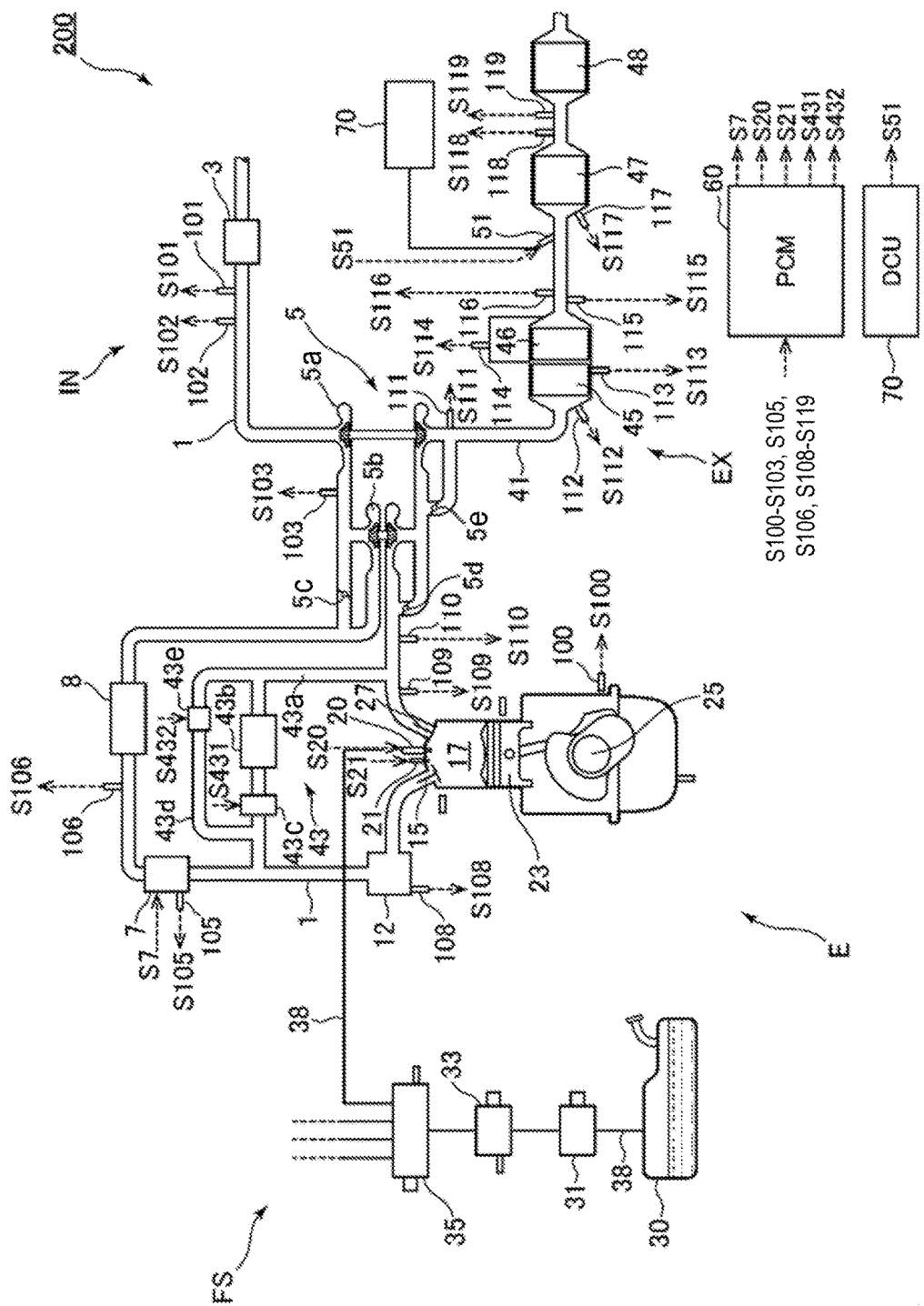
FIG. 1 is a view illustrating a schematic configuration of an engine system to which an exhaust emission control system of an engine according to one embodiment of the present invention is applied.

As illustrated in FIG. 1, an engine system 200 mainly includes a diesel engine as an engine E, an intake system IN for supplying intake air into the engine E, a fuel supply system FS for supplying fuel into the engine E, an exhaust system EX for discharging exhaust gas from the engine E, sensors 100 to 103, 105, 106 and 108 to 119 for detecting various states relating to the engine system 200, a PCM (Power-train Control Module; controller) 60 for controlling the engine system 200, and a DCU (Dosing Control Unit) 70 for executing a control relating to a selective catalytic reduction (SCR) catalyst 47.

First, the intake system IN includes an intake passage 1 through which intake air passes. In the intake passage 1, an air cleaner 3 for purifying air introduced from outside, a compressor of a turbocharger 5 for compressing intake air passing therethrough to increase pressure of the intake air, an intercooler 8 for cooling the intake air with outdoor air or coolant, an intake shutter valve 7 (corresponding to a throttle valve) for adjusting a flow rate of intake air passing therethrough, and a surge tank 12 for temporarily storing intake air to be supplied into the engine E are provided in this order from the upstream side.

Further in the intake system IN, an airflow sensor 101 for detecting an intake air amount and a temperature sensor 102 for detecting an intake air temperature are disposed in the intake passage 1 immediately downstream of the air cleaner 3. A pressure sensor 103 for detecting pressure of the intake air is provided to the turbocharger 5. A temperature sensor 106 for detecting an intake air temperature is disposed in the intake passage 1 immediately downstream of the intercooler 8. A position sensor 105 for detecting an opening of the intake shutter valve 7 is provided to the intake shutter valve 7. A pressure sensor 108 for detecting pressure of intake air in an intake manifold is provided to the surge tank 12. The various sensors 101 to 103, 105, 106 and 108 provided in the intake system IN output detection signals S101 to S103, S105, S106 and S108 corresponding to the detected parameters to the PCM 60, respectively.

Next, the engine E includes an intake valve 15 for introducing the intake air supplied from the intake passage 1 (more specifically, intake manifold) into a combustion chamber 17, a fuel injector 20 for injecting fuel to the combustion chamber 17, a glow plug 21 provided with a heat generating part for generating heat when energized, a piston 23 that reciprocates due to combustion of air-fuel mixture within the combustion chamber 17, a crankshaft 25 that rotates due to the reciprocation of the piston 23, and an exhaust valve 27 for discharging the exhaust gas generated by the combustion of the air-fuel mixture within the combustion chamber 17 to an exhaust passage 41. The engine E is also provided with a crank angle sensor 100 for detecting a crank angle which is a rotational angle of the crankshaft 25 measured, for example, with reference to a top dead center. The crank angle sensor 100 outputs a detection signal S100 corresponding to the detected crank angle to the PCM 60 which acquires an engine speed based on the detection signal S100.

The fuel supply system FS has a fuel tank 30 for storing the fuel and a fuel supply passage 38 for supplying the fuel from the fuel tank 30 to the fuel injector 20. In the fuel supply passage 38, a low-pressure fuel pump 31, a high-pressure fuel pump 33, and a common rail 35 are disposed in this order from the upstream.

Next, the exhaust system EX includes the exhaust passage 41 through which the exhaust gas passes. In the exhaust passage 41, a turbine of the turbocharger 5 which is rotated by the exhaust gas passing therethrough and drives the compressor by this rotation is disposed. Further the following components are disposed in the exhaust passage 41 on the downstream side of the turbine in the following order from the upstream: a $NO_x$ catalyst 45 for purifying $NO_x$ within the exhaust gas; a diesel particulate filter (DPF) 46 for capturing particulate matter (PM) within the exhaust gas; a urea injector 51 for injecting urea into the exhaust passage 41 downstream of the DPF 46; the SCR catalyst 47 for producing ammonia by hydrolysis of urea injected by the urea injector 51 and purifying $NO_x$ by causing a reaction (reduction) of this ammonia with $NO_x$ within the exhaust gas; and a slip catalyst 48 for oxidizing unreacted ammonia discharged from the SCR catalyst 47 to purify it. Note that the urea injector 51 is controlled to inject urea into the exhaust passage 41 based on a control signal S51 supplied from the DCU 70.

Here, the $NO_x$ catalyst 45 is described more in detail. The $NO_x$ catalyst 45 is a $NO_x$ storage catalyst (NSC) which stores $NO_x$ contained within the exhaust gas when an air-fuel ratio of the exhaust gas is lean (i.e., $\lambda>1$, larger than a theoretical air-fuel ratio), and reduces the stored $NO_x$ when the air-fuel ratio is approximately equal to stoichiometric (i.e., 1, approximately equal to the theoretical air-fuel ratio) or is rich (i.e., $\lambda<1$, smaller than the theoretical air-fuel ratio). The $NO_x$ catalyst 45 functions, not only as the NSC, but also as a diesel oxidation catalyst (DOC) which oxidizes hydrocarbon (HC), carbon monoxide (CO), etc. using oxygen within the exhaust gas to convert them into water and carbon dioxide. For example, the $NO_x$ catalyst 45 is made by coating a surface of a catalyst material layer of DOC with a catalyst material of NSC.

Further in the exhaust system EX, a pressure sensor 109 for detecting pressure of the exhaust gas and a temperature sensor 110 for detecting an exhaust gas temperature are disposed in the exhaust passage 41 upstream of the turbine of the turbocharger 5. An $O_2$ sensor 111 for detecting an oxygen concentration within the exhaust gas is disposed in the exhaust passage 41 immediately downstream of the turbine of the turbocharger 5. Moreover, the exhaust system EX includes a temperature sensor 112 for detecting an exhaust gas temperature at a position immediately upstream of the $NO_x$ catalyst 45, a temperature sensor 113 for detecting an exhaust gas temperature at a position between the $NO_x$ catalyst 45 and the DPF 46, a pressure difference sensor 114 for detecting a pressure difference of exhaust gas between positions immediately upstream and downstream of the DPF 46, a temperature sensor 115 for detecting an exhaust gas temperature at a position immediately downstream of the DPF 46, a $NO_x$ sensor 116 for detecting a concentration of $NO_x$ within the exhaust gas at a position immediately downstream of the DPF 46, a temperature sensor 117 for detecting an exhaust gas temperature at a position immediately upstream of the SCR catalyst 47, a $NO_x$ sensor 118 for detecting an concentration of $NO_x$ within the exhaust gas at a position immediately downstream of the SCR catalyst 47, and a PM sensor 119 for detecting PM within the exhaust gas at a position immediately upstream of the slip catalyst 48. The various sensors 109 to 119 provided in the exhaust system EX output detection signals S109 to S119 corresponding to the detected parameters to the PCM 60, respectively.

In this embodiment, the turbocharger 5 is configured as a two-stage turbocharging system capable of efficiently obtaining high turbocharging performance in all low to high engine speed ranges. The exhaust energy is low within the low engine speed range. That is, the turbocharger 5 includes a large turbocharger 5a for turbocharging a large amount of air within a high engine speed range, a small turbocharger 5b capable of performing efficient turbocharging even with low exhaust energy, a compressor bypass valve 5c for controlling the flow of intake air to a compressor of the small turbocharger 5b, a regulator valve 5d for controlling the flow of exhaust gas to a turbine of the small turbocharger 5b, and a wastegate valve 5e for controlling the flow of exhaust gas to a turbine of the large turbocharger 5a. By driving each valve in accordance with the operating state of the engine E (engine speed and load), the operated turbocharger is switched between the large turbocharger 5a and the small turbocharger 5b.

Figure 2:
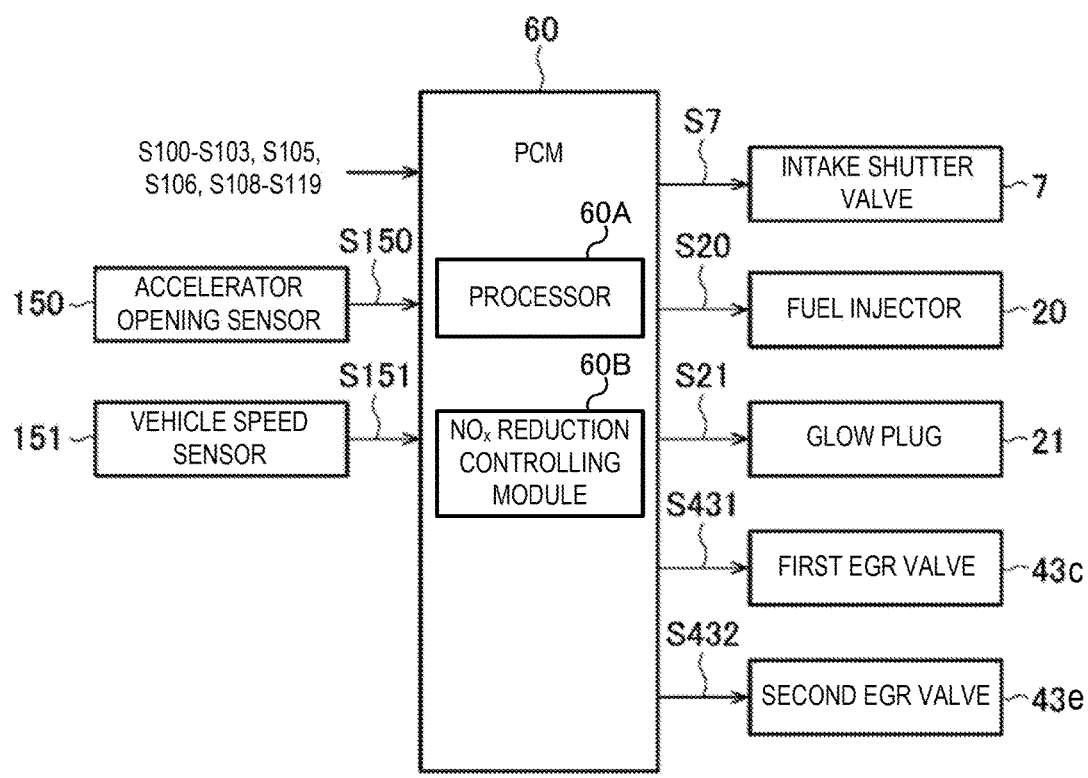
FIG. 2 is a block diagram illustrating an electrical configuration of the exhaust emission control system of the engine of the embodiment.

The engine system 200 of this embodiment also includes an exhaust gas recirculation (EGR) device 43. The EGR device 43 includes an EGR passage 43a connecting a position of the exhaust passage 41 upstream of the turbine of the turbocharger 5 with a position of the intake passage 1 downstream of the compressor of the turbocharger 5 (more specifically, downstream of the intercooler 8), an EGR cooler 43b for cooling the exhaust gas passing through the EGR passage 43a, a first EGR valve 43c for adjusting a flow rate of the exhaust gas passing through the EGR passage 43a, an EGR cooler bypass passage 43d for causing the exhaust gas to bypass the EGR cooler 43b, and a second EGR valve 43e for adjusting a flow rate of the exhaust gas passing through the EGR cooler bypass passage Next, an electrical configuration of the exhaust emission control system of the engine of the embodiment is described with reference to FIG. 2.

Based on the detection signals S100 to S103, S105, S106 and S108 to S119 of the various sensors 100 to 103, 105, 106 and 108 to S119 described above, and detection signals S150 and S151 outputted by an accelerator opening sensor 150 for detecting a position of an accelerator pedal (accelerator opening) and a vehicle speed sensor 151 for detecting a vehicle speed, respectively, the PCM 60 of this embodiment outputs a control signal S20 for mainly controlling the fuel injector 20, a control signal S7 for controlling the intake shutter valve 7, a control signal S21 for controlling the glow plug 21, and control signals S431 and S432 for controlling the first and second EGR valves 43c and 43e, respectively.

Particularly in this embodiment, the PCM 60 executes a $NO_x$ reduction control in which the fuel injector 20 is controlled to perform a post injection to control the air-fuel ratio of the exhaust gas to a target air-fuel ratio (specifically, a given air-fuel ratio approximately equal to or smaller than a theoretical air-fuel ratio), so that the $NO_x$ catalyst 45 is controlled to reduce $NO_x$ stored therein. In other words, the PCM 60 performs the post injection after a main injection. In the main injection, the fuel is injected into the cylinder (in the main injection, typically various settings including a fuel injection amount are executed so as to obtain a lean air-fuel ratio) so as to output an engine torque according to an accelerator operation by a vehicle operator. In the post injection, the fuel is injected at a timing so that the engine torque output is not influenced (e.g., expansion stroke) so as to achieve $\lambda \approx 1$ or $\lambda < 1$ and reduce $NO_x$ stored in the $NO_x$ catalyst 45. Hereinafter, such a control for reducing $NO_x$ stored in the $NO_x$ catalyst 45 is referred to as "$DeNO_x$ control." Note that "De" in the word "$DeNO_x$" is a prefix meaning separation or removal.

The PCM 60 is comprised of a processor 60A (i.e., a CPU (central processing unit)), various programs which are interpreted and executed by the processor 60A (including a basic control program, such as an OS, and an application program activated on the OS and realizing a specific function), and an internal memory such as ROM(s) and/or RAM(s), for storing programs and various data. The processor 60A is configured to execute at least a $NO_x$ reduction controlling module 60B to perform a $NO_x$ reduction control. This module is stored in the internal memory as one or more software programs.

<Fuel Injection Control>

Next, a fuel injection control of this embodiment is described. This fuel injection control is started when an ignition of the vehicle is turned on and the PCM 60 is powered on, and repeatedly executed at a given cycle.

First, the PCM 60 acquires an operating state of the vehicle. For example, the PCM 60 acquires at least the accelerator opening detected by the accelerator opening sensor 150, the vehicle speed detected by the vehicle speed sensor 151, the crank angle detected by the crank angle sensor 100, and a gear range currently set in a transmission of the vehicle.

Next, the PCM 60 sets a target acceleration based on the acquired operating state of the vehicle. For example, the PCM 60 selects, from a plurality of acceleration characteristic maps (created in advance and stored in the memory) defined for various vehicle speeds and various gear ranges, an acceleration characteristic map corresponding to the current vehicle speed and gear range, and determines the target acceleration corresponding to the current accelerator opening by referring to the selected acceleration characteristic map.

Next, the PCM 60 determines a target torque of the engine E to achieve the target acceleration. In this case, the PCM 60 determines the target torque within a range of torque which the engine E is possible to output, based on the current vehicle speed, the gear range, a current road surface inclination, a road surface μ, etc.

Next, the PCM 60 calculates the fuel injection amount to be injected from the fuel injector 20 based on the target torque and the engine speed, so as to output the determined target torque from the engine E. This fuel injection amount is applied in the main injection (main injection amount).

On the other hand, in parallel with the above processing, the PCM 60 sets a fuel injection pattern according to the operating state of the engine E. For example, when performing the above $DeNO_x$ control, the PCM 60 sets a fuel injection pattern in which at least the post injection is performed in addition to the main injection. In this case, the PCM 60 also determines the fuel injection amount applied in the post injection (post injection amount) and the timing to perform the post injection (post injection timing etc.), of which details are described later.

Then, the PCM 60 controls the fuel injector 20 based on the calculated main injection amount and the set fuel injection pattern (including the post injection amount and the post injection timing in the case where the post injection is performed). In other words, the PCM 60 controls the fuel injector 20 so that a desired amount of fuel is injected in a desired fuel injection pattern.

Next, a method of calculating the post injection amount applied in the $DeNO_x$ control (hereinafter, referred to as "$DeNO_x$ post injection amount") in this embodiment is described. The PCM 60 repeatedly executes this method at a given cycle in parallel with the above fuel injection control process. In other words, the $DeNO_x$ post injection amount is calculated as needed during the fuel injection control.

First, the PCM 60 acquires the operating state of the engine E. For example, the PCM 60 at least acquires the intake air amount (fresh air amount) detected by the airflow sensor 101, the oxygen concentration within the exhaust gas (exhaust gas oxygen concentration) detected by the $O_2$ sensor 111, and the main injection amount calculated in the above fuel injection control. The PCM 60 also acquires an exhaust gas amount (EGR gas amount) recirculated to the intake system IN by the EGR device 43, which is obtained based on a given model, for example.

Subsequently, the PCM 60 calculates an amount of air introduced into the engine E (i.e., charging amount) based on the acquired fresh air amount and the EGR gas amount. The PCM 60 calculates an oxygen concentration within the air introduced into the engine E based on the charging amount calculated.

Next, the PCM 60 calculates the post injection amount ($DeNO_x$ post injection amount) required in the post injection, which is performed in addition to the main injection, to control the air-fuel ratio to the target air-fuel ratio (the air-fuel ratio approximately equal to or smaller than the theoretical air-fuel ratio) in order to reduce the $NO_x$ stored in the $NO_x$ catalyst 45. In other words, the PCM 60 determines the post injection amount required in addition to the main injection amount in order to bring the air-fuel ratio of the exhaust gas to the target air-fuel ratio. In this case, the PCM 60 calculates the $DeNO_x$ post injection amount in consideration of the difference between the acquired oxygen concentration (the oxygen concentration detected by the $O_2$ sensor 111) and the calculated oxygen concentration. For example, based on the air-fuel ratio of the exhaust gas generated when the fuel injected in the main injection is combusted, the PCM 60 suitably performs feedback processing according to the difference between the detected oxygen concentration and the calculated oxygen concentration, and calculates the $DeNO_x$ post injection amount for controlling the air-fuel ratio to the target air-fuel ratio. By calculating the $DeNO_x$ post injection amount as described above, the air-fuel ratio of the exhaust gas is accurately controlled to the target air-fuel ratio by the post injection in the $DeNO_x$ control, and the $NO_x$ stored in the $NO_x$ catalyst 45 is surely reduced.

<$DeNO_x$ Control>

Hereinafter, the $DeNO_x$ control of this embodiment is described in detail.

(Basic Concept)

First, a basic concept of the $DeNO_x$ control of this embodiment is described.

In this embodiment, when the $NO_x$ stored amount in the $NO_x$ catalyst 45 is above a given amount, typically, when the $NO_x$ stored amount is approximately equal to a limit value (e.g., the capacity of the $NO_x$ catalyst 45), the PCM 60 executes the $DeNO_x$ control in which the fuel injector 20 is controlled to perform the post injection so that the air-fuel ratio is continuously controlled to the target air-fuel ratio, in order to reduce $NO_x$ stored in the $NO_x$ catalyst 45 to substantially zero (may suitably be referred to as "first $NO_x$ reduction control" or "active $DeNO_x$ control"). In this manner, a large amount of $NO_x$ stored in the $NO_x$ catalyst 45 is forcibly reduced and the $NO_x$ purification performance of the $NO_x$ catalyst 45 is reliably secured.

Even if the $NO_x$ stored amount in the $NO_x$ catalyst 45 is below the given amount, when the air-fuel ratio becomes rich due to acceleration of the vehicle, the PCM 60 executes a $DeNO_x$ control in which the fuel injector 20 is controlled to perform the post injection so as to temporarily control the air-fuel ratio to the target air-fuel ratio, in order to reduce $NO_x$ stored in the $NO_x$ catalyst 45 (may suitably be referred to as "second $NO_x$ reduction control" or "passive $DeNO_x$ control"). In the passive $DeNO_x$ control, the post injection is performed to control the air-fuel ratio to the target air-fuel ratio approximately equal to or smaller than the theoretical air-fuel ratio under a situation where the air-fuel ratio reduces due to the increase of the main injection amount, such as during acceleration of the vehicle. Therefore, the post injection amount for controlling the air-fuel ratio to the target air-fuel ratio is smaller compared to a case of executing the $DeNO_x$ control in a situation where the air-fuel ratio does not reduce (i.e., no acceleration). Moreover, since the passive $DeNO_x$ control is executed accompanying the acceleration of the vehicle, the frequency of executing this control is comparatively high.

In this embodiment, by applying such a passive $DeNO_x$ control, $DeNO_x$ is performed frequently while preventing a fuel consumption increase due to $DeN_x$. Although the passive $DeNO_x$ control is executed only for a comparatively short period of time, since it is executed frequently, the $NO_x$ stored amount in the $NO_x$ catalyst 45 is efficiently reduced. As a result, the $NO_x$ stored amount in the $NO_x$ catalyst 45 does not easily exceed the given amount, therefore the execution frequency of the active $DeNO_x$ control which requires a larger amount of post injection amount than in the passive $DeNO_x$ control is lowered, thus it becomes possible to effectively prevent the fuel consumption increase due to $DeNO_x$.

Further in this embodiment, when executing the above active $DeNO_x$ control, the fuel injected in the post injection (hereinafter, referred to as "post-injected fuel") is combusted inside the cylinder of the engine E to control the air-fuel ratio to the target air-fuel ratio. Here, the PCM 60 performs the post injection at a timing so that the post-injected fuel is combusted inside the cylinder. For example, the PCM 60 sets a given timing in an early half of the expansion stroke of the engine E as the post injection timing of the active $DeNO_x$ control. By applying such a post injection timing of the active $DeNO_x$ control, it is possible to prevent discharge of the post-injected fuel as unburned fuel (i.e., HC) or oil dilution due to the post-injected fuel.

On the other hand, in this embodiment, when executing the passive $DeNO_x$ control, the PCM 60 controls the air-fuel ratio to the target air-fuel ratio by discharging the post-injected fuel as unburned fuel into the exhaust passage 41 without combusting it inside the cylinder of the engine E. In this case, the PCM 60 performs the post injection at a timing so that the post-injected fuel is discharged from the cylinder to the exhaust passage 41 as unburned fuel. For example, the PCM 60 sets a given timing in a latter half of the expansion stroke of the engine E as the post injection timing of the passive $DeNO_x$ control. The post injection timing of this passive $DeNO_x$ control is retarded compared to the post injection timing of the active $DeNO_x$ control in principle. By applying such a post injection timing of the passive $DeNO_x$ control, generation of smoke (soot) due to the post-injected fuel being combusted inside the cylinder is prevented.

Here, operating ranges of the engine E within which the passive $DeNO_x$ control and the active $DeNO_x$ control are executed in the embodiment are described with reference to FIG. 3 in which the horizontal axis shows engine speed and the vertical axis shows engine load. Further in FIG. 3, the curve L1 indicates a highest torque line of the engine E.

Figure 3:
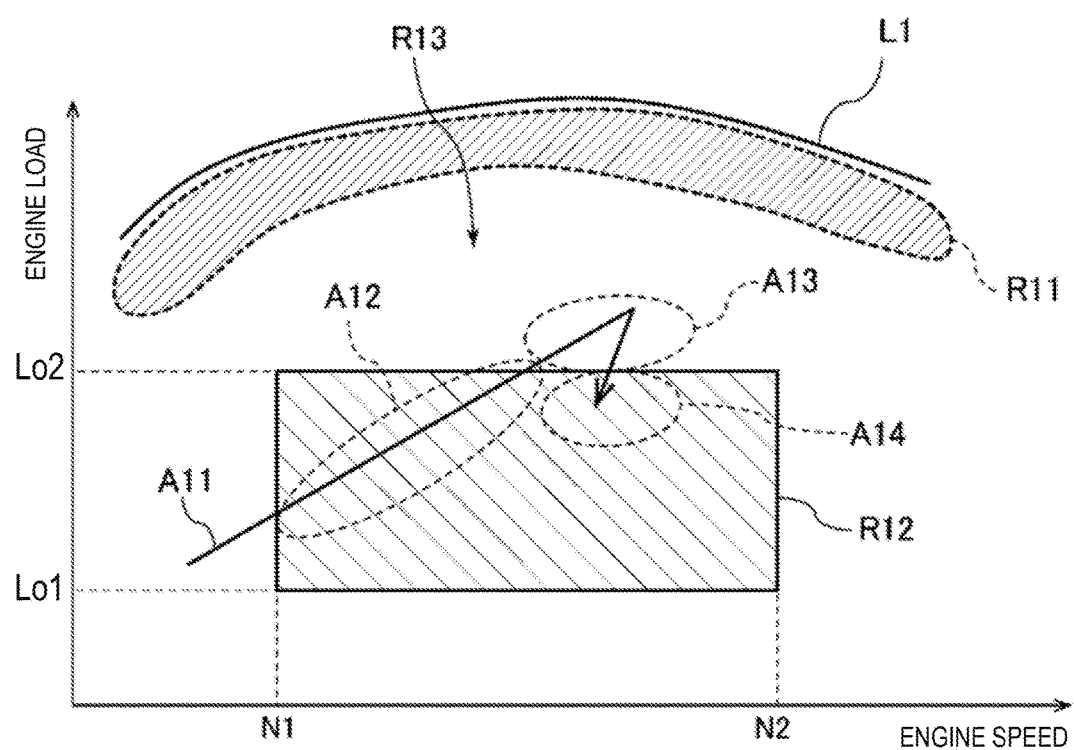
FIG. 3 is a chart illustrating operating ranges of the engine within which a passive $DeNO_x$ control and an active $DeNO_x$ control are performed, respectively, in the embodiment.

As illustrated in FIG. 3, in this embodiment, the PCM 60 executes the active $DeN_x$ control when the engine load is within a medium load range equal to and higher than a first load Lo1 but lower than a second load Lo2 (>first load Lo1) and the engine speed is within a medium speed range equal to and higher than a first speed N1 but lower than a second speed N2 (>first speed N1), i.e., the engine load and the engine speed are within an operating range indicated by R12 (hereinafter, referred to as "active $DeNO_x$ execution range R12"). The active $DeNO_x$ execution range R12 is adopted because of the following reason.

As described above, in the case of executing the active $DeNO_x$ control, in view of preventing HC generation caused by the post-injected fuel being discharged as it is, the oil dilution by the post-injected fuel, etc., the post injection is performed at the timing so that the fuel is combusted inside the cylinder. In this case, in this embodiment, when the post-injected fuel is combusted, the generation of smoke and also HC (i.e., discharge of unburned fuel due to incomplete combustion) is prevented. For example, the time for the post-injected fuel to combust is extended as long as possible, i.e., ignition is caused in a state where air and fuel are suitably mixed, so that the generation of smoke and HC is prevented. Therefore, in the active $DeNO_x$ control, a suitable amount of EGR gas is introduced to effectively delay the ignition of the post-injected fuel.

Note that the reason for preventing the HC generation during the active $DeNO_x$ control is to prevent that, in the case where the EGR gas is introduced as described above, HC also recirculates to the intake system IN as EGR gas and this HC serves as a binder to combine with soot and clog the gas passage. In addition, when the active $DeNO_x$ control is executed within an operating range within which the temperature of the $NO_x$ catalyst 45 is low and HC purification performance (purification performance of HC due to DOC in the $NO_x$ catalyst 45) is not secured, the HC generation reduction is performed to prevent the HC from being discharged without being purified. The active $DeNO_x$ execution range R12 also includes a range where the temperature of the $NO_x$ catalyst 45 is relatively low and thus cannot secure such HC purification performance.

The reason for preventing smoke generation in the active $DeNO_x$ control is to prevent that, DPF regeneration for combusting and removing PM corresponding to smoke being captured by the DPF 46 (a control of performing post injection similar to the $DeNO_x$ control) is performed frequently and the fuel consumption increases.

Incidentally, when the engine load becomes high, since the air introduced into the engine E is reduced to achieve the target air-fuel ratio, the amount of oxygen required for suitable combustion of the post-injected fuel becomes insufficient and smoke and HC tend to be generated. Especially, as the engine load increases, the in-cylinder temperature rises and the post-injected fuel is ignited without sufficient time from the post injection of the fuel, i.e., combustion occurs before air and fuel are properly mixed, which causes the generation of smoke and HC. On the other hand, within an operating range where the engine load is considerably low, the temperature of the $NO_x$ catalyst 45 is low and the $NO_x$ catalyst 45 does not perform the $NO_x$ reducing function sufficiently. In addition, within this range, the post-injected fuel does not suitably combust, i.e., a misfire occurs.

Although in the above description the phenomenon related to the engine load is described, the same phenomenon occurs with the engine speed.

Thus, in this embodiment, the operating range of the engine E corresponding to the medium load range and the medium speed range is adopted as the active $DeNO_x$ execution range R12 where the active $DeNO_x$ control is executed. In other words, in this embodiment, the active $DeNO_x$ control is executed only within the active $DeNO_x$ execution range R12 and is prohibited outside the active $DeNO_x$ execution range R12. Within the operating range where the active $DeNO_x$ control is prohibited, especially where the engine load or the engine speed is higher than within the active $DeNO_x$ execution range R12 (the range assigned with the reference character "R13"), since the $NO_x$ purification performance of the SCR catalyst 47 is sufficient, the SCR catalyst 47 purifies $NO_x$, and the discharge of $NO_x$ from the vehicle is prevented without executing the $DeNO_x$ control.

Further in this embodiment, within a range where the engine load is higher than the range R13 where the SCR catalyst 47 purifies $NO_x$ (the range assigned with the reference character "R11", hereinafter referred to as "passive $DeNO_x$ execution range R11"), since the amount of exhaust gas increases and the SCR catalyst 47 cannot purify all $NO_x$, the passive $DeNO_x$ control is executed. In this passive $DeNO_x$ control, as described above, the post injection is performed at the timing so that the post-injected fuel is discharged from the cylinder to the exhaust passage 41 as unburned fuel. Within the passive $DeNO_x$ execution range R11, since the temperature of the $NO_x$ catalyst 45 is sufficiently high and suitable purification performance of HC (HC purification performance of the DOC in the $NO_x$ catalyst 45) is secured, the $NO_x$ catalyst 45 properly purifies the unburned fuel discharged as described above.

Note that if the post-injected fuel is combusted inside the cylinder in the passive $DeNO_x$ control as in the active $DeNO_x$ control, smoke is generated. The reason for this is similar to the reason for prohibiting execution of the active $DeNO_x$ control when the engine load becomes high. Therefore, in the passive $DeNO_x$ control, the post-injected fuel is discharged from the cylinder to the exhaust passage 41 as unburned fuel.

Here, a specific example of the active $DeNO_x$ control when the operating state of the engine changes as indicated by the arrow A11 in FIG. 3 is described. First, when the operating state of the engine enters the active $DeNO_x$ execution range R12 (see the area indicated by the reference character A12), the PCM 60 executes the active $DeNO_x$ control. Then, when the operating state of the engine reaches outside the active $DeNO_x$ execution range R12 (see the area indicated by the reference character A13), the PCM 60 suspends the active $DeNO_x$ control, and the SCR catalyst 47 purifies $NO_x$. When the operating state of the engine re-enters the active $DeNO_x$ execution range R12 (see the area indicated by the reference character A14), the PCM 60 resumes the active $DeNO_x$ control. In this manner, the active $DeNO_x$ control is carried on until $NO_x$ stored in the $NO_x$ catalyst 45 drops almost down to zero.

Figure 4:
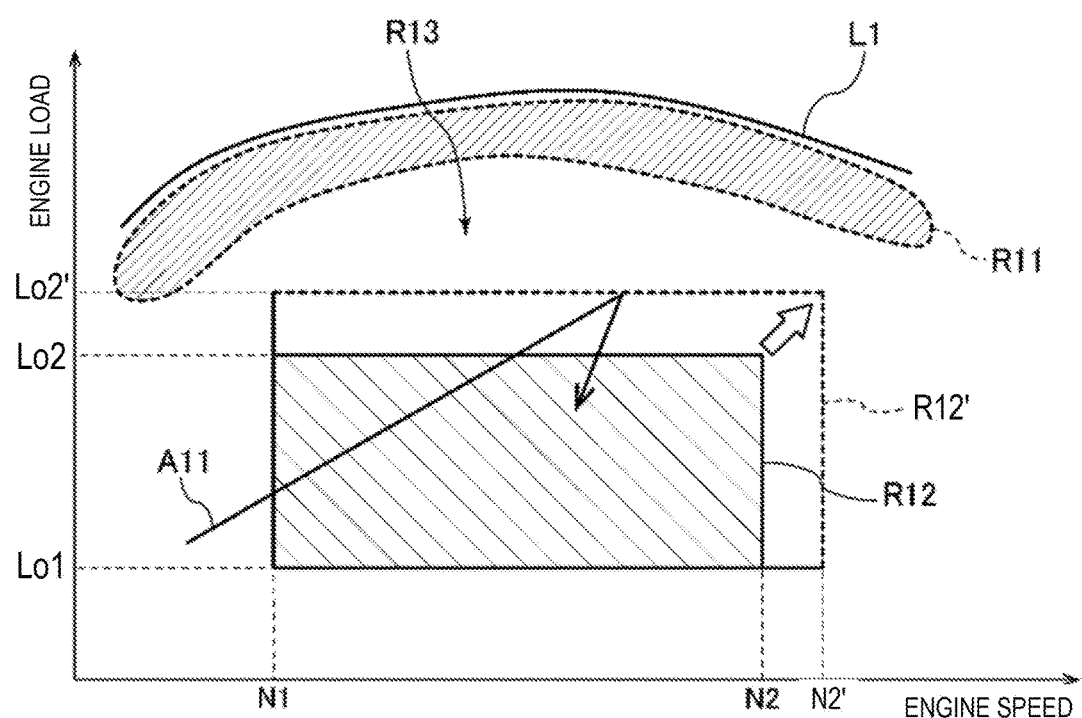
FIG. 4 is a view illustrating a method of expanding an active $DeNO_x$ execution range in this embodiment.

Next, a method of expanding the active $DeNO_x$ execution range R12 in this embodiment is described with reference to FIG. 4. FIG. 4 is a similar view to FIG. 3, and elements assigned with the same reference character as in FIG. 3 have the same meaning as those elements in FIG. 3.

As illustrated in FIG. 4, in this embodiment, when the temperature of the $NO_x$ catalyst 45 is above a given temperature and/or when the $NO_x$ stored amount of the $NO_x$ catalyst 45 is above a given amount, the active $DeNO_x$ execution range R12 is expanded to the range indicated by the reference character R12'. For example, the active $DeNO_x$ execution range R12 is expanded to the higher load side and the higher speed side by raising a second given load Lo2 defining the medium load range (see the reference character Lo2'), and also raising a second given engine speed N2 defining the medium speed range (see the reference character N2'). In this manner, it is prevented that in a situation where the temperature of the $NO_x$ catalyst 45 is comparatively high and/or the $NO_x$ stored amount in the $NO_x$ catalyst 45 is comparatively large, the active $DeNO_x$ control is interrupted and thus $NO_x$ is removed from the $NO_x$ catalyst 45 and released. For example, when the operating state of the engine changes as indicated by the arrow A11, the active $DeNO_x$ control is interrupted if the active $DeNO_x$ execution range R12 is not expanded as illustrated in FIG. 3. By expanding the active $DeNO_x$ execution range R12 to the higher load side and the higher speed side as illustrated in FIG. 4, the active $DeNO_x$ control is executed continuously without interruption.

Next, temperature ranges within which the passive $DeNO_x$ control and the active $DeNO_x$ control are executed in the embodiment are described with reference to FIG. 5 which illustrates a relationship between the catalyst temperature (horizontal axis) and an exhaust gas purification rate (vertical axis).

Specifically, the graph G11 indicates the relationship between the temperature of the $NO_x$ catalyst 45 (hereinafter, referred to as "$NO_x$ catalyst temperature") and a $NO_x$ purification rate of the $NO_x$ catalyst 45. The graph G12 indicates the relationship between the temperature of the SCR catalyst 47 (hereinafter, referred to as "SCR temperature") and a $NO_x$ purification rate of the SCR catalyst 47. The range indicated by the reference character R21 indicates a temperature range where a higher $NO_x$ purification rate than a given value is obtainable by the $NO_x$ catalyst 45, according to the $NO_x$ purification characteristic of the $NO_x$ catalyst 45 illustrated in the graph G11. The range indicated by the reference character R22 indicates a temperature range where a higher $NO_x$ purification rate than a given value is obtainable by the SCR catalyst 47, according to the $NO_x$ purification characteristic of the SCR catalyst 47 illustrated in the graph G12. The latter temperature range R22 is defined by a temperature T11 of the SCR catalyst 47. This temperature T11 is at least within an active temperature range of the SCR catalyst 47 and, for example, corresponds to a lowest value within the temperature range R22 where the $NO_x$ purification rate higher than the given value is obtainable by the SCR catalyst 47. Hereinafter, the temperature T11 is suitably referred to as "SCR determination temperature."

Figure 5:
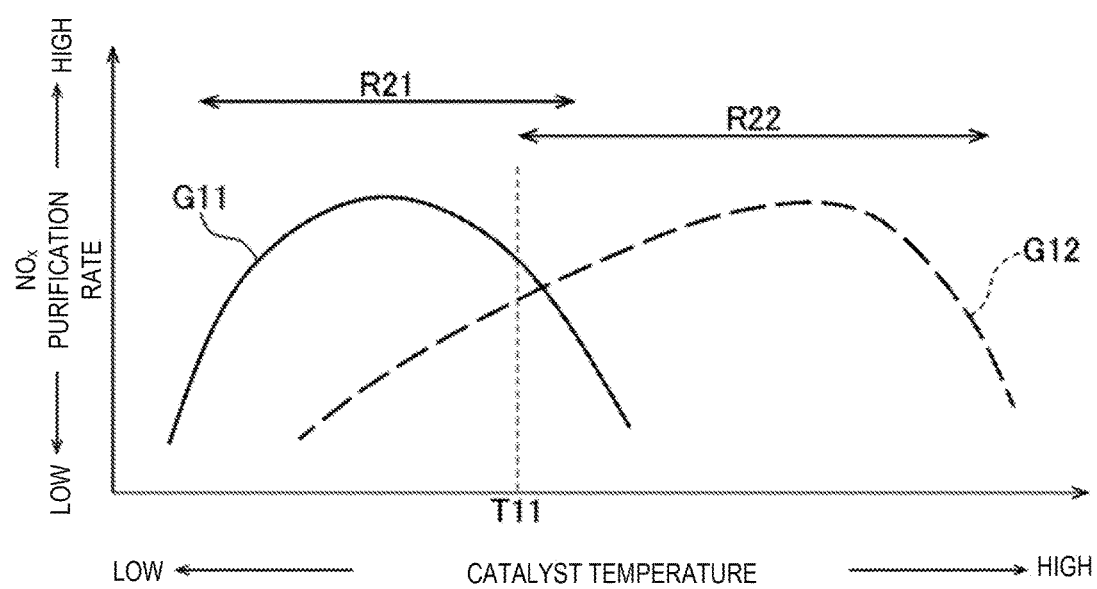
FIG. 5 is a view of a temperature range where a $DeNO_x$ control is performed in the embodiment.

As illustrated in FIG. 5, the $NO_x$ catalyst 45 exerts high $NO_x$ purification performance within a comparatively low temperature range, and the SCR catalyst 47 exerts high $NO_x$ purification performance within a comparatively high temperature range. Therefore, $NO_x$ within the exhaust gas is preferably purified by the $NO_x$ catalyst 45 when the temperature of the exhaust gas is comparatively low, and preferably purified by the SCR catalyst 47 when the temperature of the exhaust gas is comparatively high.

In this embodiment, the PCM 60 executes the passive $DeNO_x$ control and the active $DeNO_x$ control only when the SCR temperature is below the SCR determination temperature T11. If the SCR temperature is above the SCR determination temperature T11, executions of the passive $DeNO_x$ control and the active $DeNO_x$ control are prohibited. The reason for the prohibition is that since the SCR catalyst 47 suitably purifies $NO_x$ within the exhaust gas when the SCR temperature is above the SCR determination temperature T11, the $DeNO_x$ control is not particularly needed to secure the $NO_x$ purification performance of the $NO_x$ catalyst 45. Therefore, in this embodiment, when the SCR temperature is above the SCR determination temperature T11, execution of the $DeNO_x$ control is prohibited to prevent the fuel consumption increase.

Hereinafter, the passive $DeNO_x$ control and the active $DeNO_x$ control of this embodiment are described in detail.

(Passive $DeNO_x$ Control)

The passive $DeNO_x$ control of this embodiment is specifically described.

Figure 6:
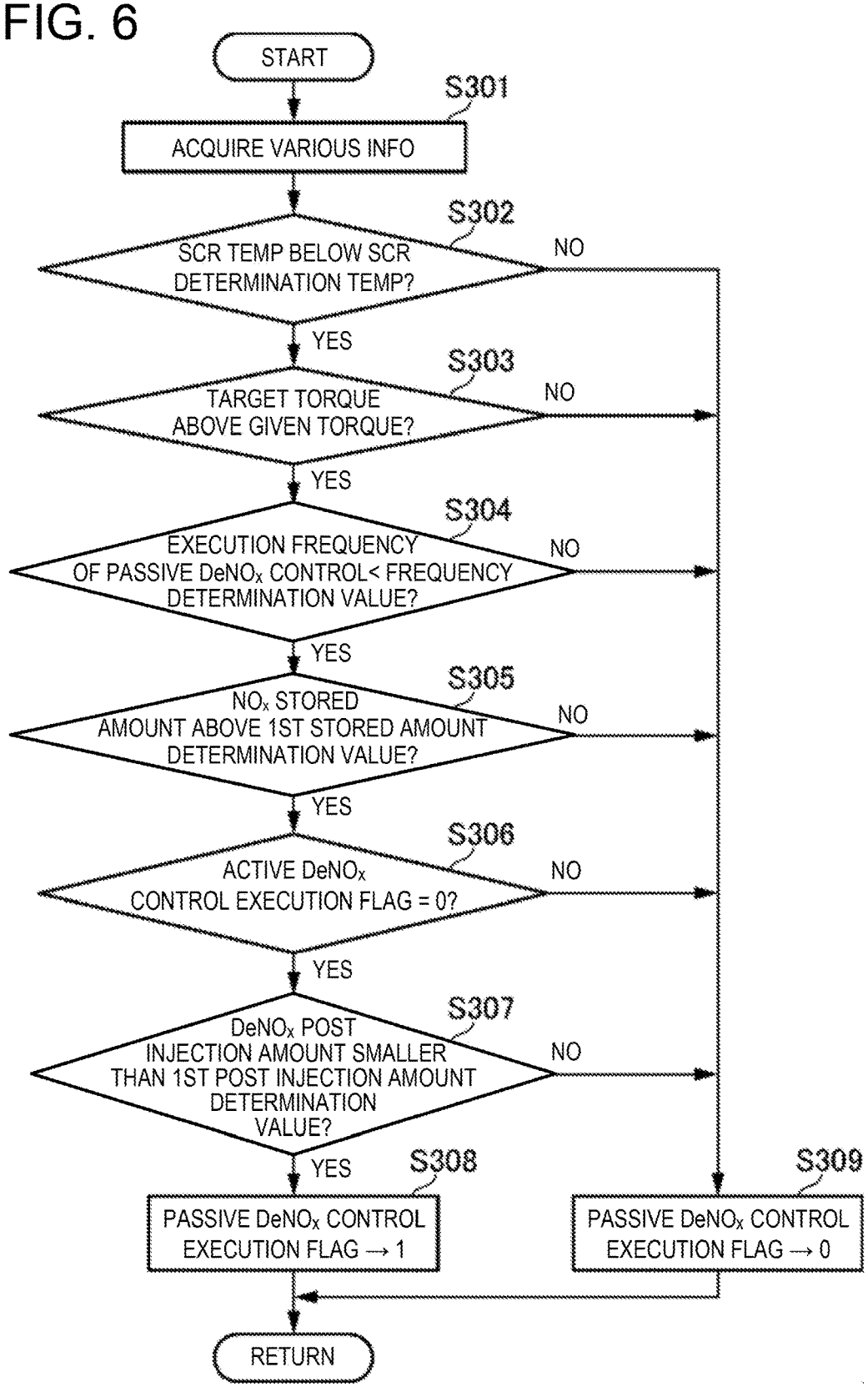
FIG. 6 is a flowchart illustrating setting of a passive $DeNO_x$ control execution flag of the embodiment.

First, setting of a passive $DeNO_x$ control execution flag which is for determining whether to execute the passive $DeNO_x$ control in this embodiment is described with reference to the flowchart (passive $DeNO_x$ control execution flag setting process) of FIG. 6. The PCM 60 repeatedly executes this passive $DeNO_x$ control execution flag setting process at a given cycle in parallel with the fuel injection control and the $DeNO_x$ post injection amount calculation.

First, at S301, the PCM 60 acquires various information of the vehicle. For example, the PCM 60 acquires at least a $NO_x$ catalyst temperature, the SCR temperature, the target torque determined in the fuel injection control, the $DeNO_x$ post injection amount calculated in the $DeNO_x$ post injection amount calculation, the $NO_x$ stored amount in the $NO_x$ catalyst 45, and a value of an active $DeNO_x$ control execution flag used for determining whether to execute the active $DeNO_x$ control. Here, the $NO_x$ catalyst temperature is estimated, for example, based on the temperature detected by the temperature sensor 112 disposed immediately upstream of the $NO_x$ catalyst 45 (the temperature detected by the temperature sensor 113 disposed between the $NO_x$ catalyst 45 and the DPF 46 may also be used). The SCR temperature is estimated based on, for example, the temperature detected by the temperature sensor 117 disposed immediately upstream of the SCR catalyst 47. The $NO_x$ stored amount is obtained by estimating the amounts of $NO_x$ within the exhaust gas based on the operating state of the engine E, the flow rate of the exhaust gas, the temperature of the exhaust gas, etc., and integrating the $NO_x$ amounts. The active $DeNO_x$ control execution flag is set by an active $DeNO_x$ control execution flag setting process described later (see FIG. 9).

At S301, the PCM 60 also acquires the execution frequency of the passive $DeNO_x$ control within a given period. For example, the PCM 60 acquires the number of times the passive $DeNO_x$ control is executed within a given period (e.g., several seconds or several minutes) as the execution frequency of the passive $DeNO_x$ control.

Next, at S302, the PCM 60 determines whether the SCR temperature acquired at S301 is below an SCR determination temperature T11. If the SCR temperature is below the SCR determination temperature T11 (S302: YES), the process proceeds to S303. On the other hand, if the SCR temperature is above the SCR determination temperature T11 (S302: NO), the process proceeds to S309. In this case, the PCM 60 sets the passive $DeNO_x$ control execution flag to "0" to prohibit execution of the passive $DeNO_x$ control (S309) since the $NO_x$ within the exhaust gas is suitably purified by the SCR catalyst 47. Then, the process ends.

Note that at S302, whether the exhaust gas flow rate is above a given amount may be determined in addition to whether the SCR temperature being below the SCR determination temperature T11. In this case, even if the SCR temperature is above the SCR determination temperature T11, as long as the exhaust gas flow rate is determined to be above the given amount, the passive $DeNO_x$ control execution flag is preferably not set to "0." The reason for this is to perform the passive $DeNO_x$ control and secure the $NO_x$ purification performance of the $NO_x$ catalyst 45, in consideration that the $NO_x$ purification rate of the SCR catalyst 47 decreases as the exhaust gas amount increases.

At S303, the PCM 60 determines whether the target torque acquired at S301 is above a given torque. This determination is equivalent to determining whether the air-fuel ratio when the fuel corresponding to the target torque is injected falls below a given value on the rich side. In other words, it is equivalent to determining whether the current operating state is an operating state where the passive $DeNO_x$ control is executable while preventing the fuel consumption increase (given acceleration state). If the target torque is above the given torque (S303: YES), the process proceeds to S304. On the other hand, if the target torque is lower than the given torque (S303: NO), the process proceeds to S309. In this case, the PCM 60 sets the passive $DeNO_x$ control execution flag to "0" to prohibit execution of the passive $DeNO_x$ control and prevent the fuel consumption increase (S309). Then, the process ends.

At S304, the PCM 60 determines whether the execution frequency of the passive $DeNO_x$ control acquired at S301 is below a given frequency determination value. If this execution frequency is below the frequency determination value (S304: YES), the process proceeds to S305. On the other hand, if the execution frequency is above the frequency determination value (S304: NO), the process proceeds to S309. In this case, the PCM 60 sets the passive $DeNO_x$ control execution flag to "0" to prohibit execution of the passive DeNOx control (S309).

If the passive $DeNO_x$ control is executed in a situation where the passive $DeNO_x$ control has been carried out comparatively frequently, there is a high possibility that oil dilution occurs due to the post injection. Therefore, in this embodiment, when the execution frequency of the passive DeNO$_x$ control is above the frequency determination value (S304: NO), execution of the passive DeNO$_x$ control is prohibited so as to prevent the oil dilution due to the post injection of the passive DeNO$_x$ control. On the other hand, even if the passive DeNO$_x$ control is executed in a situation where the passive DeNO$_x$ control has hardly been carried out (i.e., the execution frequency of the passive DeNO$_x$ control is comparatively low), the possibility of oil dilution occurring due to the post injection is low. Therefore, in this embodiment, when the execution frequency of the passive DeNO$_x$ control is lower than the frequency determination value (S304: YES), execution of the passive DeNO$_x$ control is allowed.

Next, at S305, the PCM 60 determines whether the NO$_x$ stored amount acquired at S301 is above a first stored amount determination value. For example, the first stored amount determination value is set to a value that is approximately half of the limit value of the NO$_x$ storable amount. As a result of this determination, if the NO$_x$ stored amount is above the first stored amount determination value (S305: YES), the process proceeds to S306. On the other hand, if the NO$_x$ stored amount is lower than the first stored amount determination value (S305: NO), the process proceeds to S309. In this case, the PCM 60 sets the passive DeNO$_x$ control execution flag to "0" to prohibit unnecessary execution of the passive DeNO$_x$ control and prevent the fuel consumption increase (S309). Then, the process ends.

At S306, the PCM 60 determines whether the active DeNO$_x$ control execution flag acquired at S301 is "0." In other words, the PCM 60 determines whether to execute the active DeNO$_x$ control. If the active DeNO$_x$ control execution flag is "0" (S306: YES), the process proceeds to S307. On the other hand, if the active DeNO$_x$ control execution flag is not "0," i.e., if it is "1" (S306: NO), the process proceeds to S309. In this case, the PCM 60 sets the passive DeNO$_x$ control execution flag to "0" to prohibit execution of the passive DeNO$_x$ control and preferentially execute the active DeNO$_x$ control (S309). In other words, even if the execution condition of the passive DeNO$_x$ control is satisfied, when the execution condition of the active DeNO$_x$ control is satisfied, the active DeNO$_x$ control is preferentially executed. Then, the process ends.

At S307, the PCM 60 determines whether the DeNO$_x$ post injection amount acquired at S301 is smaller than a first post injection amount determination value. If the DeNO$_x$ post injection amount is smaller than the first post injection amount determination value (S307: YES), the process proceeds to S308. Typically, this condition at S307 is satisfied when the vehicle is accelerating (more specifically, a prerequisite for satisfying this condition is for the vehicle to be accelerating). In this case, since all the conditions at S302 to S307 are satisfied, the PCM 60 sets the passive DeNO$_x$ control execution flag to "1" to permit execution of the passive DeNO$_x$ control (S308). Then, the process ends. On the other hand, if the DeNO$_x$ post injection amount is above the first post injection amount determination value (S307: NO), the process proceeds to S309. In this case, since the post injection is performed with a comparatively large amount of fuel and there is a high possibility of oil dilution, the PCM 60 sets the passive DeNO$_x$ control execution flag to "0" to prohibit execution of the passive DeNO$_x$ control and prevent the oil dilution (S309). Then, the process ends.

Note that in one example, the first post injection amount determination value used in the determination of S307 is preferably set with reference to a post injection amount which highly possibly will cause oil dilution. In another example, the first post injection amount determination value may be set in view of preventing, in addition to the oil dilution, the fuel consumption increase caused by execution of the passive DeNO$_x$ control. In such a case, determining whether the DeNO$_x$ post injection amount is below the first post injection amount determination value at S307 is equivalent to determining whether the air-fuel ratio when the amount of fuel corresponding to the target torque is injected falls below the given value. In other words, it is substantially the same as determining whether the target torque acquired is above the given torque at S303. Therefore, since the determination at S303 and the determination at S307 are redundant, the passive DeNO$_x$ control execution flag may be set by performing the determination at S307 without performing the determination at S303, for example.

Further, the first post injection amount determination value is not limited to be a fixed value, and may be changed according to an in-cylinder temperature. For example, the first post injection amount determination value may be increased as the in-cylinder temperature rises. Since vaporization of the post-injected fuel progresses and oil dilution becomes less likely to occur when the in-cylinder temperature rises, the restriction on the DeNO$_x$ post injection amount in executing the passive DeNO$_x$ control may be loosened, i.e., an upper limit of the DeNO$_x$ post injection amount may be increased.

Figure 7:
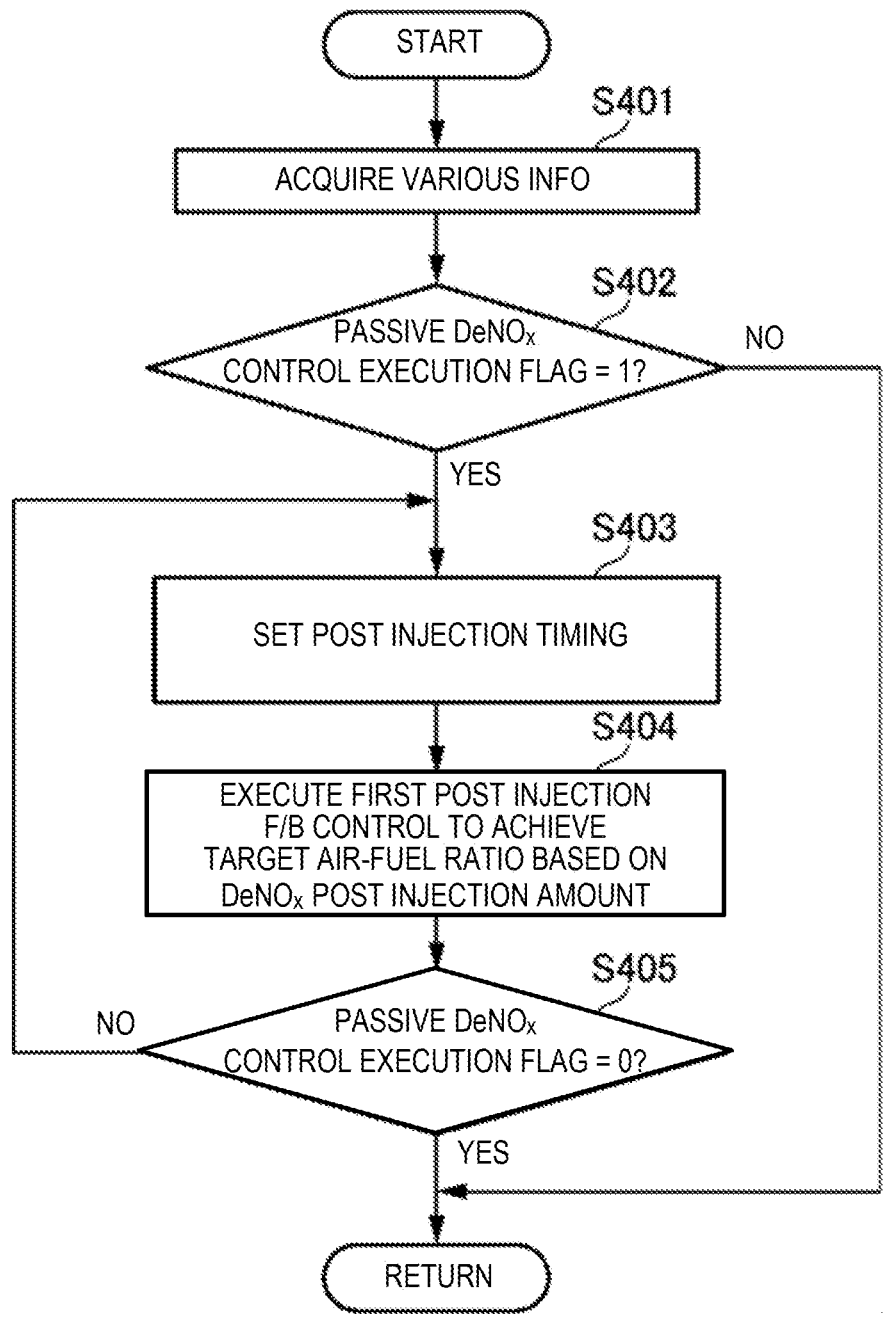
FIG. 7 is a flowchart illustrating the passive $DeNO_x$ control of the embodiment.

Next, the passive DeNO$_x$ control of this embodiment, which is executed based on the passive DeNO$_x$ control execution flag set as described above, is described with reference to the flowchart (passive DeNO$_x$ control process) of FIG. 7. The PCM 60 repeatedly executes this passive DeNO$_x$ control process at a given cycle in parallel with the fuel injection control, the DeNO$_x$ post injection amount calculation, and the passive DeNO$_x$ control execution flag setting process illustrated in FIG. 6.

First, at S401, the PCM 60 acquires various information of the vehicle. For example, the PCM 60 acquires at least the DeNO$_x$ post injection amount calculated in the DeNO$_x$ post injection amount calculation and the value of the passive DeNO$_x$ control execution flag set in the passive DeNO$_x$ control execution flag setting process illustrated in FIG. 6.

Next, at S402, the PCM 60 determines whether the passive DeNO$_x$ control execution flag acquired at S401 is "1." In other words, the PCM 60 determines whether the passive DeNO$_x$ control is to be executed. If the passive DeNO$_x$ control execution flag is "1" (S402: YES), the process proceeds to S403. On the other hand, if the passive DeNO$_x$ control execution flag is "0" (S402: NO), the process is terminated without executing the passive DeNO$_x$ control.

At S403, the PCM 60 sets the post injection timing applied in the passive DeNO$_x$ control. The method of this setting is described in detail.

As described above, in this embodiment, when executing the passive DeNO$_x$ control, in view of preventing smoke generation due to the combustion of the post-injected fuel, the air-fuel ratio is controlled to the target air-fuel ratio by discharging the post-injected fuel to the exhaust passage 41 as unburned fuel. In order to discharge the post-injected fuel as unburned fuel, the post injection may be performed at a comparatively retarded timing on the expansion stroke. However, if the post injection timing is retarded excessively, oil dilution occurs due to the post injection. Therefore, in this embodiment, in view of preventing generation of smoke and oil dilution, a suitable timing in the latter half of the expansion stroke is typically adopted as the post injection timing of the passive DeNO$_x$ control. In this embodiment, the post injection timing at least in the latter half of the expansion stroke is retarded more as the in-cylinder temperature rises. This is because when the in-cylinder temperature rises, even if the post injection timing is retarded further, vaporization of the post-injected fuel progresses and oil dilution becomes less likely to occur.

Note that since it is difficult to detect the in-cylinder temperature with a sensor or estimate it at high accuracy, the PCM 60 may set the post injection timing by using various indexes which reflect the in-cylinder temperature. For example, the PCM 60 sets the post injection timing based on the engine water temperature and/or the intake air temperature. In this example, the PCM 60 retards the post injection timing as the engine water temperature rises or retards the post injection timing as the intake air temperature rises.

Although in the above description the post injection timing is changed according to the in-cylinder temperature, in another example, the post injection timing may not be changed according to the in-cylinder temperature, etc., and a fixed value may be applied to the post injection timing (i.e., fixed timing in the latter half of the expansion stroke).

Next, at S404, the PCM 60 controls the fuel injector 20 to inject the DeNO$_x$ post injection amount acquired at S401, at the post injection timing set at S403, so as to control the air-fuel ratio to the target air-fuel ratio and reduce the NO$_x$ stored in the NO$_x$ catalyst 45. For example, due to variations in detections of the various sensors, variations in the fuel injection amount of the fuel injector 20, etc., based on the air-fuel ratio corresponding to the detection value of the 02 sensor 111 disposed in the exhaust passage 41 (actual air-fuel ratio) and the target air-fuel ratio, the PCM 60 executes a F/B (feedback) control of the post injection amount injected from the fuel injector 20 so as to match the actual air-fuel ratio with the target air-fuel ratio. Hereinafter, the F/B control of the post injection amount executed in the passive DeNO$_x$ control is suitably referred to as "first post injection F/B control." Although in this first post injection F/B control an F/F control (feed-forward control) is executed in addition to the F/B control, since the F/B control is mainly executed, the term "F/B control" is used for the sake of convenience.

More specifically, the PCM 60 first sets a comparatively small air-fuel ratio (comparatively rich air-fuel ratio) as a target value, and executes the F/F control of the post injection amount from the fuel injector 20. Then the PCM 60 executes the F/B control of the post injection amount from the fuel injector 20 by using a comparatively large F/B gain based on the actual air-fuel ratio and the target air-fuel ratio. In this manner, the actual air-fuel ratio is made to promptly match with the target air-fuel ratio in the passive DeNO$_x$ control which is executed for a comparatively short period of time.

Note that practically, the PCM 60 executes the processing of S404 in the fuel injection control.

Next, at S405, the PCM 60 determines whether the passive DeNO$_x$ control execution flag is "0." In other words, the PCM 60 determines whether to end the passive DeNO$_x$ control. If the passive DeNO$_x$ control execution flag is "0" (S405: YES), the process ends. In this case, the PCM 60 ends the passive DeNO$_x$ control. On the other hand, if the passive DeNO$_x$ control execution flag is not "0" (S405: NO), i.e., if the passive DeNO$_x$ control execution flag is maintained at "1," the process returns to S403 to perform the process from S403 again. In this case, the PCM 60 continues the passive DeNO$_x$ control. In other words, the PCM 60 continues the passive DeNO$_x$ control until the passive DeNO$_x$ control execution flag switches from "1" to "0."

Figure 8:
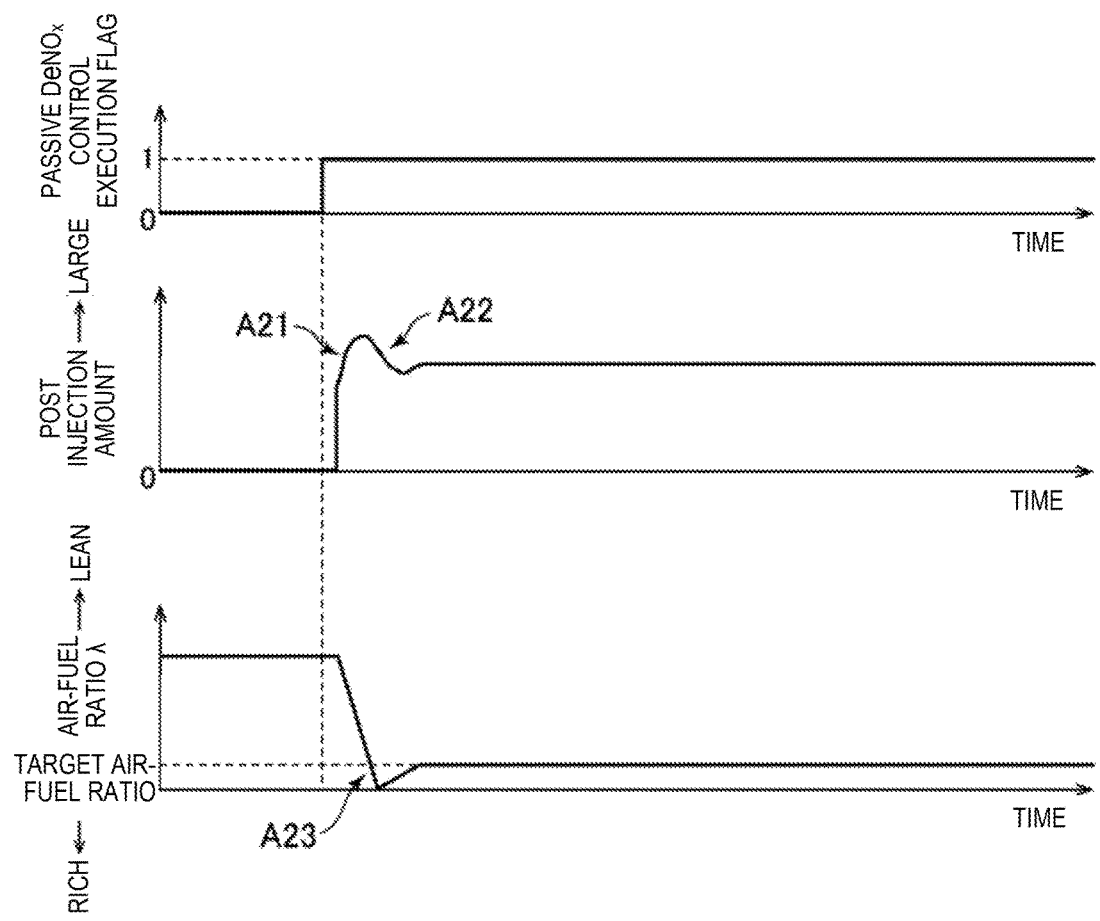
FIG. 8 shows time charts illustrating a specific example of a first post injection FB control of the embodiment.

Next, a specific example of the first post injection F/B control executed in the passive DeNO$_x$ control of this embodiment is described with reference to the time charts of FIG. 8. FIG. 8 shows the passive DeNO$_x$ control execution flag, the post injection amount, and the actual air-fuel ratio ($\lambda$) in this order from the top.

As illustrated in FIG. 8, when the passive DeNO$_x$ control execution flag is switched from "0" to "1," the PCM 60 starts the passive DeNO$_x$ control in which the fuel injection valve 20 is controlled to perform the post injection so as to control the actual air-fuel ratio to the target air-fuel ratio, in order to reduce NO$_x$ stored in the NO$_x$ catalyst 45. For example, the PCM 60 executes the first post injection F/B control so that the actual air-fuel ratio promptly matches with the target air-fuel ratio based on the actual air-fuel ratio and the target air-fuel ratio. More specifically, the PCM 60 first sets a comparatively small air-fuel ratio (comparatively rich air-fuel ratio) as a target value, and executes the F/F control of the post injection amount from the fuel injector 20 (see the arrow A21). Thereby, the post injection amount increases greatly and the actual air-fuel ratio swiftly changes to the richer side. Then the PCM 60 executes the F/B control (see the arrow A22) of the post injection amount from the fuel injector 20 by using a comparatively large F/B gain based on the actual air-fuel ratio and the target air-fuel ratio. In this manner, the actual air-fuel ratio matches with the target air-fuel ratio after the actual air-fuel ratio becomes richer than the target air-fuel ratio once, that is, the actual air-fuel ratio temporarily undershoots the target air-fuel ratio (see the arrow A23) due to the large change in the post injection amount.

As described above, in this embodiment, by executing the first post injection F/B control in the passive DeNO$_x$ control, the post injection amount is greatly changed so that the actual air-fuel ratio swiftly matches with the target air-fuel ratio. In this manner, the actual air-fuel ratio is instantaneously controlled to the target air-fuel ratio in a short period of time in which the passive DeNO$_x$ control is performed, so that NO$_x$ stored in the NO$_x$ catalyst 45 is surely reduced.

Note that although the amount of unburned fuel discharged from the engine E to the exhaust passage 41 increases when the actual air-fuel ratio undershoots the target air-fuel ratio as described above, this does not particularly cause a problem since, in the passive DeNO$_x$ control, sufficient HC purification performance of the NO$_x$ catalyst 45 (HC purification performance of DOC in the NO$_x$ catalyst 45) is secured and also the execution period of the passive DeNO$_x$ control is relatively short, and thus the NO$_x$ catalyst 45 suitably purifies the unburned fuel discharged as described above.

(Active DeNO$_x$ Control)

Next, the active DeNO$_x$ control according to this embodiment is specifically described.

Figure 9:
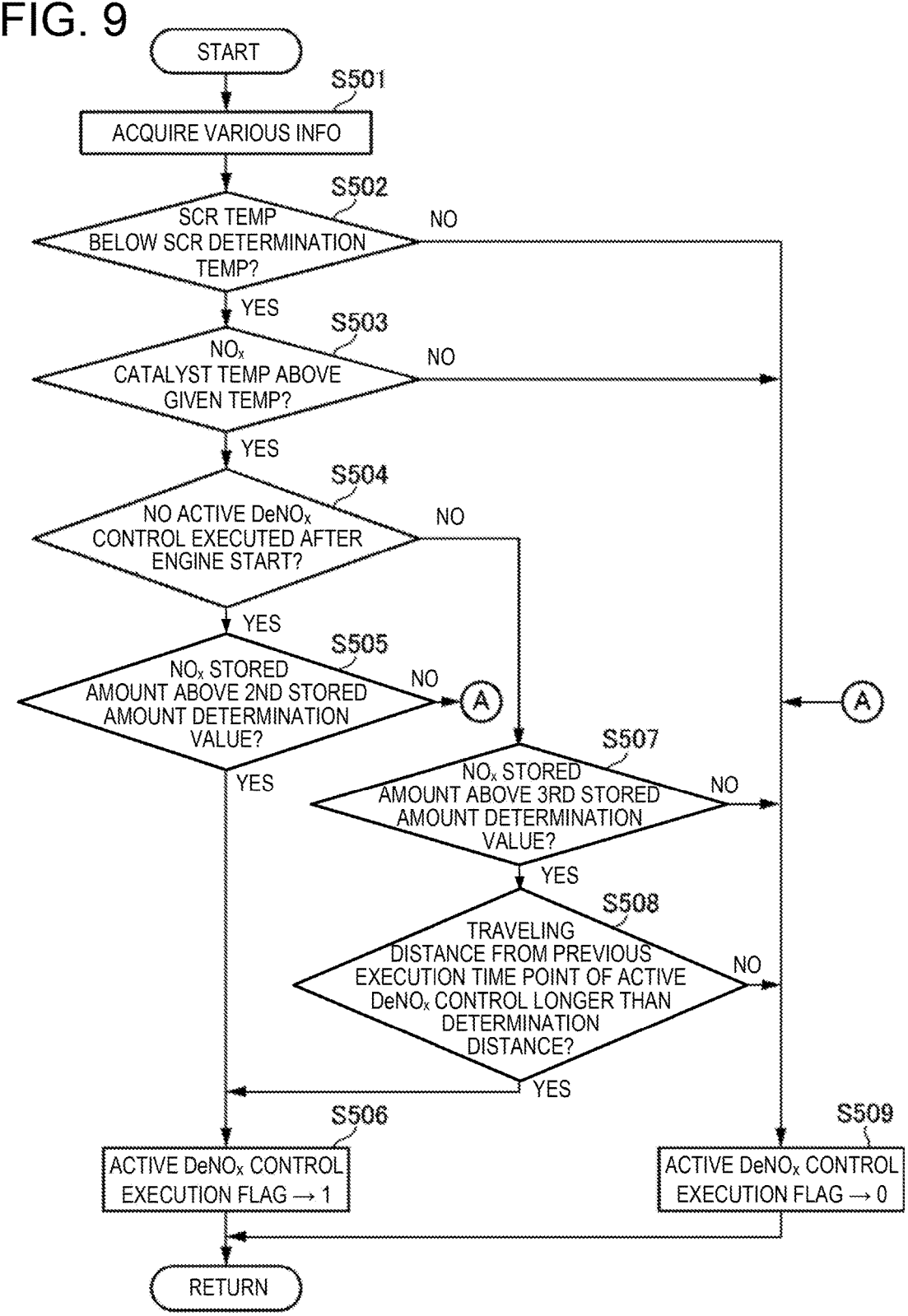
FIG. 9 is a flowchart illustrating setting of an active $DeNO_x$ control execution flag of the embodiment.

First, setting of the active DeNO$_x$ control execution flag used for determining whether to execute the active DeNO$_x$ control of the embodiment is described with reference to the flowchart (active DeNO$_x$ control execution flag setting process) of FIG. 9. The PCM 60 repeatedly executes this active DeNO$_x$ control execution flag setting process at a given cycle in parallel with the fuel injection control, the DeNO$_x$ post injection amount calculation, the passive DeNO$_x$ control execution flag setting process illustrated in FIG. 6, etc.

First, at S501, the PCM 60 acquires various information of the vehicle. For example, the PCM 60 at least acquires the NO$_x$ catalyst temperature, the SCR temperature, and the NO$_x$ stored amount in the NO$_x$ catalyst 45. Note that the methods of obtaining the NO$_x$ catalyst temperature, the SCR temperature, and the NO$_x$ stored amount are as described for S301 in the above "Passive DeNO$_x$ Control" section.

Next, at S502, the PCM 60 determines whether the SCR temperature acquired at S501 is below the SCR determination temperature T11. If the SCR temperature is below the SCR determination temperature T11 (S502: YES), the process proceeds to S503. On the other hand, if the SCR temperature is above the SCR determination temperature T11 (S502: NO), the process proceeds to S509. In this case, since the SCR catalyst 47 suitably purifies $NO_x$ within the exhaust gas, the PCM 60 sets the active $DeNO_x$ control execution flag to "0" to prohibit execution of the active $DeNO_x$ control (S509). Then, the process ends.

At S503, the PCM 60 determines whether the $NO_x$ catalyst temperature acquired at S501 is above a given temperature. When the $NO_x$ catalyst temperature is low, even if the air-fuel ratio is controlled to the target air-fuel ratio, the $NO_x$ catalyst 45 hardly reduces the stored $NO_x$. Therefore, at S503, whether the $NO_x$ stored in the $NO_x$ catalyst 45 is reducible is determined. The given temperature used in the determination of S503 is set based on the $NO_x$ catalyst temperature at which the $NO_x$ stored in the $NO_x$ catalyst 45 is reducible. If the $NO_x$ catalyst temperature is above the given temperature (S503: YES), the process proceeds to S504. On the other hand, when the $NO_x$ catalyst temperature is below the given temperature (S503: NO), the process proceeds to S509. In this case, the PCM 60 sets the active $DeNO_x$ control execution flag to "0" to prohibit execution of the active $DeNO_x$ control (S509).

At S504, the PCM 60 determines whether the active $DeNO_x$ control has been executed even once after an engine start. The determination of S504 is performed so that if the active $DeNO_x$ control has not been executed after the engine start, the execution condition of the active $DeNO_x$ control is loosened than in the case where the active $DeNO_x$ control has been executed, so as to preferentially execute the active $DeNO_x$ control. For example, if the active $DeNO_x$ control has been executed (S504: NO), the execution condition of S507 and the execution condition of S508 are used, which are comparatively strict, whereas if the active $DeNO_x$ control has not been executed, only the execution condition of S505 which is comparatively loose is used (these are described later in detail). If the active $DeNO_x$ control has not been executed (S504: YES), the process proceeds to S505.

At S505, the PCM 60 determines whether the $NO_x$ stored amount acquired at S501 is above a second stored amount determination value. For example, the second stored amount determination value is set to a value somewhat lower than the limit value of the $NO_x$ stored amount. If the $NO_x$ stored amount is above the second stored amount determination value (S505: YES), the process proceeds to S506. In this case, the PCM 60 sets the active $DeNO_x$ control execution flag to "1" to permit execution of the active $DeNO_x$ control (S506). In this manner, by executing the active $DeNO_x$ control after the engine start to somewhat forcibly reduce the $NO_x$ stored in the $NO_x$ catalyst 45, the $NO_x$ purification performance of the $NO_x$ catalyst 45 is reliably secured. On the other hand, when the $NO_x$ stored amount is smaller than the second stored amount determination value (S505: NO), the process proceeds to S509. In this case, the PCM 60 sets the active $DeNO_x$ control execution flag to "0" to prohibit unnecessary execution of the active $DeNO_x$ control (S509). Then, the process ends.

On the other hand, if the active $DeNO_x$ control has been executed after the engine start (S504: NO), the process proceeds to S507 where the PCM 60 determines whether the $NO_x$ stored amount acquired at S501 is above a third stored amount determination value (a value larger than the second stored amount determination value). For example, the third stored amount determination value is set to a value close to the limit value of the $NO_x$ stored amount. If the $NO_x$ stored amount is above the third stored amount determination value (S507: YES), the process proceeds to S508. On the other hand, if the $NO_x$ stored amount is smaller than the third stored amount determination value (S507: NO), the process proceeds to S509. In this case, the PCM 60 sets the active $DeNO_x$ control execution flag to "0" to prohibit unnecessary execution of the active $DeNO_x$ control (S509). Then, the process ends.

At S508, the PCM 60 determines whether a traveling distance of the vehicle from the previous execution time point of the active $DeNO_x$ control is longer than a given determination distance. If this traveling distance is longer than the determination distance (S508: YES), the process proceeds to S506. In this case, the PCM 60 sets the active $DeNO_x$ control execution flag to "1" to permit execution of the active $DeNO_x$ control (S506). By doing so, the active $DeNO_x$ control is executed to forcibly reduce a large amount of $NO_x$ stored in the $NO_x$ catalyst 45, thus the $NO_x$ purification performance of the $NO_x$ catalyst 45 is reliably secured. On the other hand, if the traveling distance is less than the determination distance (S508: NO), the process proceeds to S509. In this case, the PCM 60 sets the active $DeNO_x$ control execution flag to "0" to prohibit execution of the active $DeNO_x$ control (S509). Then, the process ends.

When the active $DeNO_x$ control is executed in a situation where the traveling distance from the previous execution time point of the active $DeNO_x$ control is short (i.e., the execution interval of the active $DeNO_x$ control is short), the possibility of the oil dilution due to the post injection occurring becomes high. Therefore, in this embodiment, when this traveling distance is shorter than the determination distance (S508: NO), execution of the active $DeNO_x$ control is prohibited and the oil dilution due to the post injection in the active $DeNO_x$ control is prevented. On the other hand, if the traveling distance from the previous execution time point of the active $DeNO_x$ control is long (i.e., the execution interval of the active $DeNO_x$ control is long), even if the active $DeNO_x$ control is to be executed, the possibility of the oil dilution occurring due to the post injection is low. Therefore, in this embodiment, when the traveling distance from the previous execution time point of the active $DeNO_x$ control is longer than the determination distance (S508: YES), execution of the active $DeNO_x$ control is permitted.

Next, the active $DeNO_x$ control of this embodiment executed based on the active $DeNO_x$ control execution flag set as described above is described with reference to the flowchart (active $DeNO_x$ control process) of FIG. 10. The PCM 60 repeatedly executes this active $DeNO_x$ control process at a given cycle in parallel with the fuel injection control, the $DeNO_x$ post injection amount calculation, and the active $DeNO_x$ control execution flag setting process illustrated in FIG. 9.

In the active $DeNO_x$ control process of this embodiment, the control of the glow plug 21 (glow control) and the control of the EGR gas (EGR control) are executed in parallel with the fuel injection control in the active $DeNO_x$ control (the fuel injection control for performing the post injection so as to control the air-fuel ratio to the target air-fuel ratio). The glow control is executed to energize the glow plug 21 in the active $DeNO_x$ control so as to improve the ignitability of the post-injected fuel in the active $DeNO_x$ control by the heat of the glow plug 21. The EGR control is executed to recirculate a suitable amount of EGR gas in the active $DeNO_x$ control so as to delay the ignition of the post-injected fuel, so that the combustion stability of the post-injected fuel is secured and smoke generation is prevented. In this embodiment, the fuel injection control in the active DeNO$_x$ control is started after the state of the glow plug 21 and the state of the EGR gas are stabilized by the glow control and the EGR control, respectively.

Figure 10:
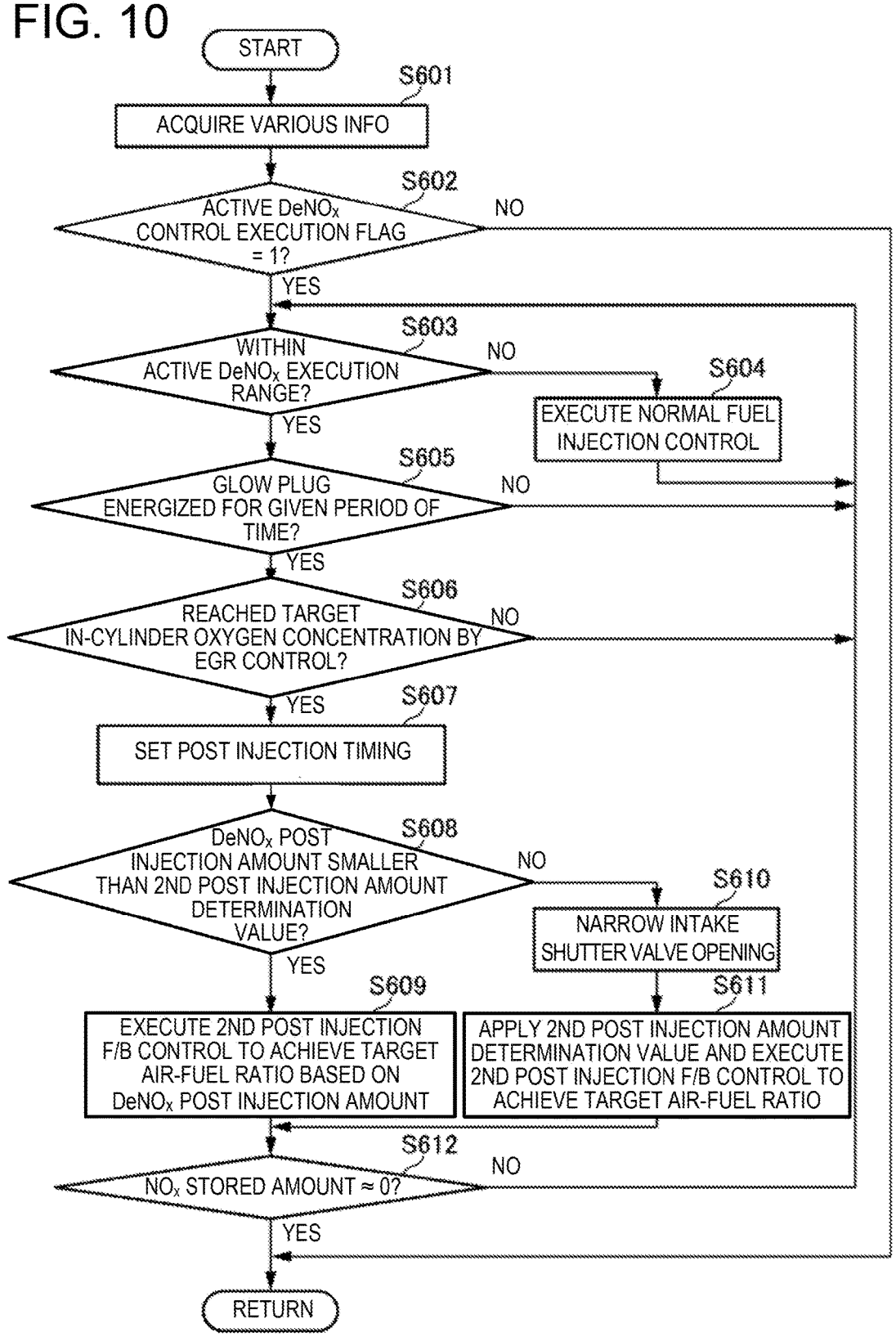
FIG. 10 is a flowchart illustrating the active $DeNO_x$ control of the embodiment.

The active DeNO$_x$ control process in FIG. 10 is described in detail. First, at S601, the PCM 60 acquires various information of the vehicle. For example, the PCM 60 at least acquires the engine load, the engine speed, the NO$_x$ catalyst temperature, the DeNO$_x$ post injection amount calculated in the DeNO$_x$ post injection amount calculation, and the value of the active DeNO$_x$ control execution flag set in the active DeNO$_x$ control execution flag setting process illustrated in FIG. 9. In addition, the PCM 60 acquires an oxygen concentration inside the cylinder (in-cylinder oxygen concentration) obtained by estimation.

Next, at S602, the PCM 60 determines whether the active DeNO$_x$ control execution flag acquired at S601 is "1." In other words, the PCM 60 determines whether the active DeNO$_x$ control is to be executed. If the active DeNO$_x$ control execution flag is "1" (S602: YES), the process proceeds to S603. On the other hand, if the active DeNO$_x$ control execution flag is "0" (S602: NO), the process is terminated without executing the active DeNO$_x$ control.

At S603, the PCM 60 determines whether the operating state of the engine (engine load and engine speed) is within the active DeNO$_x$ execution range R12 (see FIG. 3). Here, if the NO$_x$ catalyst temperature is above a given temperature and/or if the NO$_x$ stored amount is above a given amount, the PCM 60 expands the active DeNO$_x$ execution range R12 to the higher load side and the higher speed side (see FIG. 4). If the operating state of the engine is within the active DeNO$_x$ execution range R12 (S603: YES), the process proceeds to S605. On the other hand, if the operating state of the engine is outside the active DeNO$_x$ execution range R12 (S603: NO), the process proceeds to S604.

At S604, without executing the active DeNO$_x$ control, i.e., without executing the fuel injection control which includes the post injection, the PCM 60 executes a normal fuel injection control which does not include the post injection for controlling the air-fuel ratio to the target air-fuel ratio. Typically, the PCM 60 only executes the control for causing the main injection with the fuel injection amount corresponding to the target torque. The PCM 60 actually executes the processing of S604 in the fuel injection control described above. Then, the process returns to S603 to perform the determination again. In other words, if the active DeNO$_x$ control execution flag is "1," the PCM 60 executes the normal fuel injection control while the operating state of the engine remains outside the active DeNO$_x$ execution range R12. When the operation state enters the active DeNO$_x$ execution range R12, the PCM 60 switches the control from the normal fuel injection control to the fuel injection control in the active DeNO$_x$ control. For example, when the operating state of the engine deviates from the active DeNO$_x$ execution range R12 during the fuel injection control in the active DeNO$_x$ control, the PCM 60 suspends the fuel injection control and executes the normal fuel injection control. Then, when the operating state enters the active DeNO$_x$ execution range R12, the PCM 60 resumes the fuel injection control in the active DeNO$_x$ control.

Next, at S605, the PCM 60 determines whether the glow plug 21 has been energized by the glow control for over a given period of time, i.e., whether the energizing time of the glow plug 21 has reached the given time period, so as to determine whether the energized glow plug 21 has become stable. The given time period used at S605 is set based on the energizing time required for the glow plug 21 to reach a desired temperature, for example. If the energizing time of the glow plug 21 has reached the given time period (S605: YES), the process proceeds to S606. On the other hand, if the energizing time of the glow plug 21 has not reached the given time period (S605: NO), the process returns to S603. In this case, the PCM 60 waits until the energizing time of the glow plug 21 reaches the given time period.

At S606, the PCM 60 determines whether the estimated in-cylinder oxygen concentration has substantially reached a target in-cylinder oxygen concentration for the fuel injection control (including the post injection) in the active DeNO$_x$ control by the EGR control. For example, the PCM 60 determines whether a difference (absolute value) between the in-cylinder oxygen concentration and the target in-cylinder oxygen concentration is below a given value. At S606, whether the amount of EGR gas introduced by the EGR control is stable, in other words, whether a desired flow rate of EGR gas is introduced is determined. If the in-cylinder oxygen concentration has substantially reached the target in-cylinder oxygen concentration by the EGR control (S606: YES), the process proceeds to S607. On the other hand, if the in-cylinder oxygen concentration has not reached the target in-cylinder oxygen concentration (S606: NO), the process returns to S603. In this case, the PCM 60 waits until the in-cylinder oxygen concentration substantially reaches the target in-cylinder oxygen concentration by the EGR control.

At S607, the PCM 60 sets the post injection timing to be applied in the active DeNO$_x$ control. The method of this setting is described in detail.

As described above, in this embodiment, when executing the active DeNO$_x$ control, the air-fuel ratio is controlled to the target air-fuel ratio by combusting the post-injected fuel inside the cylinder. To combust the post-injected fuel inside the cylinder, the post injection may be performed at a comparatively advanced timing on the expansion stroke. However, if the post injection timing is excessively advanced, ignition occurs before air and fuel are suitably mixed, and smoke is generated. Therefore, in this embodiment, the post injection timing is suitably set on the advance side, specifically, a suitable timing in the early half of the expansion stroke is adopted as the post injection timing of the active DeNO$_x$ control, and a suitable amount of EGR gas is introduced in the active DeNO$_x$ control. Thus, the ignition of post-injected fuel is delayed to prevent the generation of smoke etc. In this embodiment, the post injection timing at least in the early half of the expansion stroke is retarded as the engine load becomes higher. This is because, since the fuel injection amount increases and the smoke becomes easier to be generated as the engine load increases, the post injection timing is retarded as much as possible. In this case, if the post injection timing is excessively retarded, the post-injected fuel becomes easier to be combusted (misfire) and HC is generated. Therefore, in this embodiment, the post injection timing is suitably retarded.

Further, in this embodiment, the post injection timing is advanced, i.e., the retarding amount of the post injection timing is reduced, as the engine speed becomes higher. When the engine speed is high, if the fuel is injected at the same crank angle as when the engine speed is low, since misfire may occur due to the short period of time for the fuel to ignite, in this embodiment, the post injection timing is advanced as the engine speed increases so as to secure the combustion stability.

At S608, the PCM 60 determines whether the DeNO$_x$ post injection amount acquired at S601 is smaller than the second post injection amount determination value. The second post injection amount determination value is set larger than the first post injection amount determination value used in the passive DeNO$_x$ control (see S307 in FIG. 6). Thus, it is possible to achieve a larger post injection amount in the active DeNO$_x$ control than in the passive DeNO$_x$ control, and the air-fuel ratio becomes controllable to the target air-fuel ratio regardless of the operating state of the engine E (e.g., even if it is not in a state where the air-fuel ratio reduces, such as during acceleration).

If the DeNO$_x$ post injection amount is smaller than the second post injection amount determination value (S608: YES), the process proceeds to S609 where the PCM 60 controls the fuel injector 20 to inject the DeNO$_x$ post injection amount acquired at S601 at the post injection timing set at S607, and controls the air-fuel ratio to the target air-fuel ratio so as to reduce NO$_x$ stored in the NO$_x$ catalyst 45. For example, due to variations in detections of various sensors, variations in the fuel injection amount of the fuel injector 20, etc., based on the air-fuel ratio corresponding to the detection value of the 02 sensor 111 disposed in the exhaust passage 41 (actual air-fuel ratio) and the target air-fuel ratio, the PCM 60 executes a F/B (feedback) control of the post injection amount injected from the fuel injector 20 so as to match the actual air-fuel ratio with the target air-fuel ratio. Hereinafter, the F/B control of the post injection amount executed in the active DeNO$_x$ control is suitably referred to as "second post injection F/B control." Although in this second post injection F/B control, an F/F control (feed-forward control) is executed in addition to the F/B control, since the F/B control is mainly executed, the term "F/B control" is used for the sake of convenience.

More specifically, the PCM 60 first sets a comparatively large air-fuel ratio (comparatively less rich air-fuel ratio) as a target value, and executes the F/F control of the post injection amount from the fuel injector 20. Then the PCM 60 executes the F/B control of the post injection amount from the fuel injector 20 by using a comparatively small FB gain based on the actual air-fuel ratio and the target air-fuel ratio. In this manner, the actual air-fuel ratio is gently changed toward the target air-fuel ratio in the active DeNO$_x$ control so as to prevent the actual air-fuel ratio from becoming richer than the target air-fuel ratio, i.e., the actual air-fuel ratio undershoots the target air-fuel ratio.

Note that the PCM 60 actually performs the processing of S609 in the fuel injection control.

On the other hand, if the DeNO$_x$ post injection amount is above the second post injection amount determination value (S608: NO), the process proceeds to S610. At S610, the PCM 60 reduces the oxygen concentration of air introduced into the engine E so as to control the air-fuel ratio to the target air-fuel ratio by using the post injection amount which is below the second post injection amount determination value (specifically, the second post injection amount determination value itself is applied as the DeNO$_x$ post injection amount). In this case, the PCM 60 executes at least one of a control for narrowing the opening of the intake shutter valve 7, a control for increasing the EGR gas amount, and a control for lowering the turbocharging pressure by the turbocharger 5, so as to reduce the oxygen concentration of the air introduced into the engine E, i.e., reduce the charging amount. For example, the PCM 60 obtains the turbocharging pressure required for controlling the air-fuel ratio to the target air-fuel ratio by using the DeNO$_x$ post injection amount to which the second post injection amount determination value is applied. The PCM 60 reduces the opening of the intake shutter valve 7 to be a desired opening based on the actual turbocharging pressure (the pressure detected by the pressure sensor 108) and the EGR gas amount so as to achieve this turbocharging pressure. Then, the process proceeds to S611.

Note that the intake shutter valve 7 is fully opened in the normal operating state of the engine E, whereas during DeNO$_x$, DPF regeneration, idle operation, etc., the opening of the intake shutter valve 7 is typically a given basic opening. In the operating state where the EGR gas is not introduced, the intake shutter valve 7 is feedback-controlled based on the turbocharging pressure.

Next, at S611, the PCM 60 applies the second post injection amount determination value to the DeNO$_x$ post injection amount, i.e., sets the DeNO$_x$ post injection amount to be the second post injection amount determination value. Moreover, the PCM 60 controls the fuel injector 20 to inject this DeNO$_x$ post fuel injection amount at the post injection timing set at S607, so as to control the air-fuel ratio to the target air-fuel ratio and reduce the NO$_x$ stored in the NO$_x$ catalyst 45. For example, similar to S609, the PCM 60 performs the second post injection F/B control. That is, the PCM 60 first sets a comparatively large air-fuel ratio (comparatively less rich air-fuel ratio) as a target value, and executes the F/F control of the post injection amount from the fuel injector 20. Then the PCM 60 executes the F/B control of the post injection amount injected from the fuel injector 20 by using a comparatively small F/B gain based on the actual air-fuel ratio and the target air-fuel ratio. Note that the PCM 60 actually performs the processing of S611 in the fuel injection control.

After S609 or S611, the process proceeds to S612 where the PCM 60 determines whether the NO$_x$ stored amount in the NO$_x$ catalyst 45 is substantially zero. For example, the PCM 60 determines that the NO$_x$ stored amount is substantially zero when the NO$_x$ stored amount estimated based on the operating state of the engine E, the flow rate of the exhaust gas, the temperature of the exhaust gas, etc. becomes substantially zero and the detection value of the NO$_x$ sensor 116 disposed immediately downstream of the DPF 46 changes (S612: YES). Then the process ends. Here, the PCM 60 ends the active DeNO$_x$ control. The PCM 60 further resets the NO$_x$ stored amount used in the active DeNO$_x$ control process and the active DeNO$_x$ control execution flag setting process in FIG. 9 to zero.

On the other hand, when the NO$_x$ stored amount is not substantially zero (S612: NO), the process returns to S603. In this case, the PCM 60 continues the active DeNO$_x$ control. In other words, the PCM 60 continues the active DeNO$_x$ control until the NO$_x$ stored amount becomes almost zero. Particularly, even if the execution condition of the active DeNO$_x$ control (e.g., the condition of S603) is not satisfied during the active DeNO$_x$ control and the active DeNO$_x$ control is suspended, when the execution condition of the active DeNO$_x$ control is satisfied thereafter, the PCM 60 promptly resumes the active DeNO$_x$ control to bring the NO$_x$ stored amount to substantially zero.

Here, the NO$_x$ stored amount is determinable as substantially zero based on the detection value of the NO$_x$ sensor 116 because of the following reason. Since the NO$_x$ sensor 116 also functions as an oxygen concentration sensor, the detection value of the NO$_x$ sensor 116 corresponds to the air-fuel ratio reaches the NO$_x$ sensor 116. While the NO$_x$ catalyst 45 performs reduction, i.e., when the NO$_x$ stored amount is not substantially zero, oxygen generated by reducing NO$_x$ reaches the NO$_x$ sensor 116. On the other hand, when the NO$_x$ stored amount becomes substantially zero, such oxygen generated by reduction no longer reaches the NO$_x$ sensor 116. Therefore, at the timing when the NO$_x$ stored amount becomes substantially zero, the air-fuel ratio reaching the NO$_x$ sensor 116 decreases, thus the detection value of the NO$_x$ sensor 116 changes.

Note that the second post injection amount determination value used in the active DeNO$_x$ control process is not limited to a fixed value, and may be changed according to the in-cylinder temperature. For example, similar to the first post injection amount determination value described above, in consideration of progression in vaporization of post-injected fuel and oil dilution being less likely to occur as the in-cylinder temperature rises, the second post injection amount determination value may be increased as the in-cylinder temperature rises.

Figure 11:
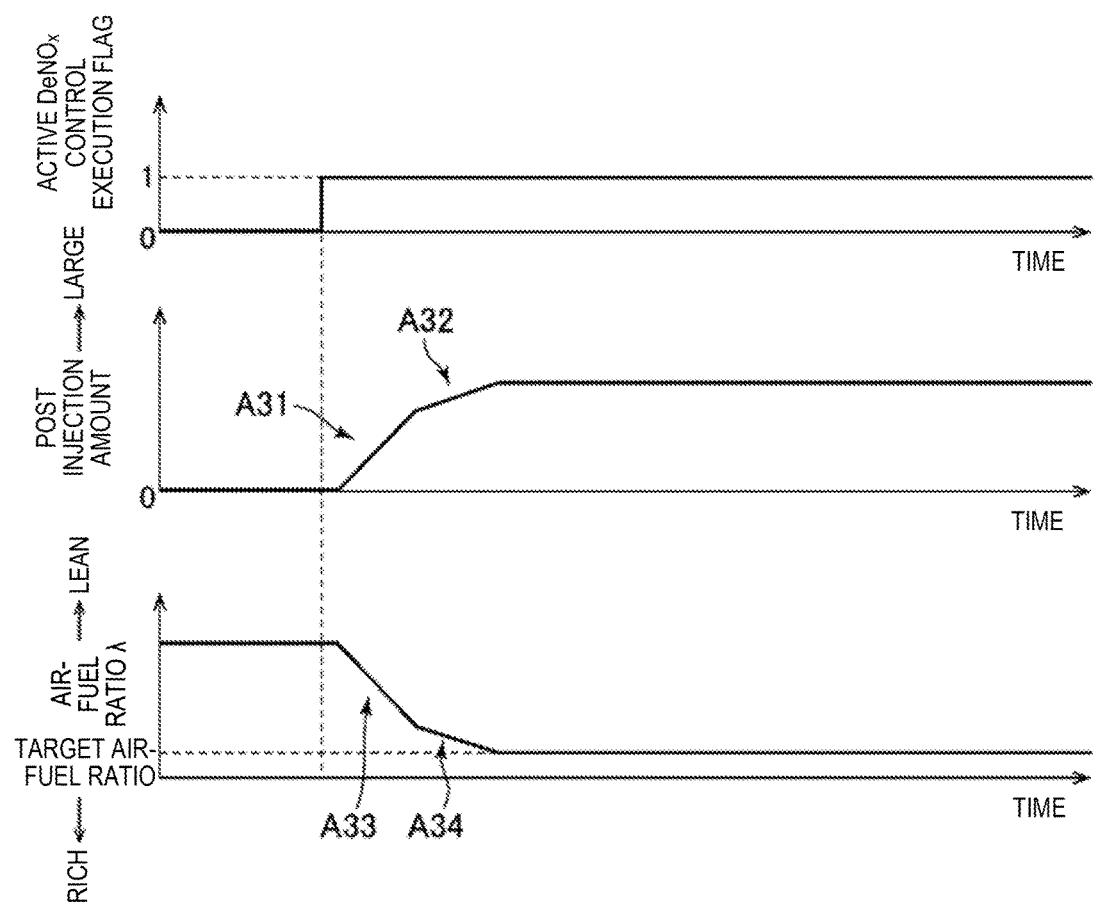
FIG. 11 shows time charts illustrating a specific example of a second post injection FB control of the embodiment.

Next, a specific example of the second post injection F/B control executed in the active DeNO$_x$ control of this embodiment is described with reference to the time charts of FIG. 11. FIG. 11 shows the active DeNO$_x$ control execution flag, the post injection amount, and the actual air-fuel ratio ($\lambda$) in this order from the top.

As illustrated in FIG. 11, when the active DeNO$_x$ control execution flag is switched from "0" to "1," the PCM 60 starts the active DeNO$_x$ control in which the fuel injection valve 20 is controlled to perform the post injection so as to control the actual air-fuel ratio to the target air-fuel ratio, in order to reduce NO$_x$ stored in the NO$_x$ catalyst 45. For example, the PCM 60 executes the second post injection F/B control so that the actual air-fuel ratio gradually changes to match with the target air-fuel ratio based on the actual air-fuel ratio and the target air-fuel ratio. More specifically, the PCM 60 first sets a comparatively small air-fuel ratio (comparatively rich air-fuel ratio) as a target value, and executes the F/F control of the post injection amount from the fuel injector 20 (see the arrow A31). Thus, the post injection amount gradually increases and the actual air-fuel ratio gradually changes to the richer side (see the arrow A33). Then the PCM 60 executes the F/B control of the post injection amount from the fuel injector 20 by using a smaller F/B gain than in the first post injection F/B control (see FIG. 8) based on the actual air-fuel ratio and the target air-fuel ratio (see the arrow A32). In this manner, the post injection amount increases even more gradually and the actual air-fuel ratio gradually changes, thus the actual air-fuel ratio matches with the target air-fuel ratio without undershooting the target air-fuel ratio (see the arrow A34).

As described above, in this embodiment, by executing the second post injection F/B control in the active DeNO$_x$ control, the change rate of the post injection amount is limited, that is, the change rate of the post injection amount is controlled not to exceed a given speed. Particularly in this second post injection F/B control, the change rate of the post injection amount is limited so that the actual air-fuel ratio does not undershoot the target air-fuel ratio. In the second post injection F/B control executed in the active DeNO$_x$ control, the change rate of the post injection amount is made lower than that of the first post injection F/B control executed in the passive DeNO$_x$ control in principle (in other words, in the first post injection F/B control executed in the passive DeNO$_x$ control, the change rate of the post injection amount is made larger than that of the second post injection F/B control executed in the active DeNO$_x$ control). In this embodiment, by executing such a second post injection F/B control, generation of a large amount of smoke and HC due to the actual air-fuel ratio undershooting the target air-fuel ratio during the active DeNO$_x$ control is certainly prevented.

<Operation and Effects>

Next, the operation and effects of the exhaust emission control system of the engine of this embodiment are described.

According to this embodiment, since the active DeNO$_x$ control is executed only within the active DeNO$_x$ execution range R12 as the medium-load medium-speed range, smoke and HC are suitably prevented from being generated due to the first NO$_x$ reduction control being executed outside the medium load range and the combustion of the post-injected fuel in this NO$_x$ reduction control.

For example, within the high load range or the high speed range, smoke may be generated when the post-injected fuel is combusted inside the cylinder. According to this embodiment, since the active DeNO$_x$ control is prohibited within such ranges, smoke generation is suitably prevented. Within the low load range and the low speed range, although the post-injected fuel may not suitably be combusted and generate HC, according to this embodiment, since the active DeNO$_x$ control is prohibited, HC generation is suitably prevented. In addition, within the low load range and the low speed range, although the reduction of the NO$_x$ catalyst 45 may not suitably be performed due to the low NO$_x$ catalyst temperature, according to this embodiment, the active DeNO$_x$ control is prohibited to prevent unnecessary post injection.

According to this embodiment, the execution of the active DeNO$_x$ control is suspended when the engine load deviates from the active DeNO$_x$ execution range R12, and is resumed when the engine load re-enters the active DeNO$_x$ execution range R12. Thus, the NO$_x$ stored amount is reliably reduced to substantially zero.

According to this embodiment, when the NO$_x$ catalyst temperature is above the given temperature and/or the NO$_x$ stored amount is above the given amount, the active DeNO$_x$ execution range R12 is expanded to the higher load side and the higher speed side. In this manner, when the NO$_x$ catalyst temperature is comparatively high and/or the NO$_x$ stored amount is comparatively large, a situation is suitably prevented where the active DeNO$_x$ control is interrupted and thus NO$_x$ is removed from the NO$_x$ catalyst 45 and released.

According to this embodiment, within the passive DeNO$_x$ execution range R11 on the higher load side of the active DeNO$_x$ execution range R12, the passive DeNO$_x$ control in which the post-injected fuel is discharged as unburned fuel without being combusted inside the cylinder is executed. Thus, smoke generation due to the post-injected fuel being combusted within the high load range is suitably prevented while ensuring execution of DeNO$_x$ within the high load range. In the passive DeNO$_x$ control, although the post-injected fuel is discharged as unburned fuel, since the NO$_x$ catalyst temperature is sufficiently high and the HC purification performance is secured within the passive DeNO$_x$ execution range R11, unburned fuel discharged as described above is suitably purified by the NO$_x$ catalyst 45.

According to this embodiment, since the SCR catalyst 47 is disposed in the exhaust passage 41 in addition to the NO$_x$ catalyst 45, within the range where the passive DeNO$_x$ control and the active DeNO$_x$ control are not executed, NO$_x$ within the exhaust gas is suitably purified by the SCR catalyst 47. Thus, the exhaust gas purification performance is secured.

<Modifications>

In the above embodiment, the permission/prohibition of the active DeNO$_x$ control is determined based on the travelling distance from the previous execution time point of the active DeNO$_x$ control. Alternatively, in one modification, the permission/prohibition of the active DeNO$_x$ control may be determined based on lapse time from the previous execution time point of the active DeNO$_x$ control. In other words, the active DeNO$_x$ control may be prohibited when the lapse time from the previous execution time point of the active DeNO$_x$ control is less than a given determination time. Also in this modification, the determination time may be set similarly to the determination distance. For example, the determination time may be set shorter as the in-cylinder temperature rises. Further, the engine water temperature or the intake air temperature may be used as an index reflecting the in-cylinder temperature, so that the determination time is set shorter as the engine water temperature rises or the intake air temperature rises.

As described above, even in the modification of determining the permission/prohibition of the active DeNO$_x$ control based on the lapse time from the previous execution time point of the active DeNO$_x$ control, the same effects as those described in the above "Operation and Effects" section are obtained. In other words, oil dilution due to the post-injected fuel in the active DeNO$_x$ control is suitably prevented.

In the above embodiment, execution of the passive DeNO$_x$ control is completely prohibited when the execution frequency of the passive DeNO$_x$ control is above the frequency determination value; however, it is not limited to this. Compared with when the execution frequency of the passive DeNO$_x$ control is less than the frequency determination value, execution of the passive DeNO$_x$ control may simply be limited when the execution frequency of the passive DeNO$_x$ control is above the frequency determination value. For example, when the execution frequency of the passive DeNO$_x$ control is above the frequency determination value, the number of times of performing the post injection may be reduced lower than when the execution frequency of the passive DeNO$_x$ control is less than the frequency determination value.

Similarly, when the traveling distance from the previous execution of the active DeNO$_x$ control is less than the determination distance, or when the lapse time from the previous execution of the active DeNO$_x$ control is less than the determination time, the execution of the active DeNO$_x$ control may suitably be limited without being completely prohibited.

Although in the above embodiment the recirculation of the EGR gas to the intake system IN is completely prohibited in the passive DeNO$_x$ control, within the extent that the deposit caused by the recirculation of the EGR gas does not block the passage, a small amount of EGR gas may be recirculated during the passive DeNO$_x$ control. In this case, at least in the passive DeNO$_x$ control, the EGR gas amount is preferably reduced smaller than in the active DeNO$_x$ control.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
5 Turbocharger
7 Intake Shutter Valve
17 Combustion Chamber
20 Fuel Injector
41 Exhaust Passage
43 EGR Device
43a EGR Passage
43b EGR Cooler
43c First EGR Valve
43d EGR Cooler Bypass Passage
43e Second EGR Valve
45 NO$_x$ Catalyst
46 DPF
47 SCR Catalyst
60 PCM (controller)
111 O$_2$ Sensor
116 NO$_x$ Sensor
200 Engine System
E Engine
EX Exhaust System
IN Intake System

What is claimed is:

1. An exhaust emission control system of an engine, including a NO$_x$ catalyst disposed in an exhaust passage of the engine for storing NO$_x$ within exhaust gas when an air-fuel ratio of the exhaust gas is lean, and reducing the stored NO$_x$ when the air-fuel ratio is approximately stoichiometric or rich, the system comprising:
a selective catalytic reduction (SCR) catalyst disposed in the exhaust passage for purifying NO$_x$ within the exhaust gas by causing a reaction with ammonia; and
a processor configured to execute:
a NO$_x$ reduction controlling module for performing, when a NO$_x$ stored amount in the NO$_x$ catalyst exceeds a given determination amount, a first NO$_x$ reduction control in which a fuel injector performs a post injection of fuel to continuously control the air-fuel ratio to a target air-fuel ratio so that the stored NO$_x$ is reduced and the NO$_x$ stored amount falls below a given amount, the target air-fuel ratio being a ratio at which the stored NO$_x$ is reducible, the post injection causing the injected fuel to combust inside a cylinder, the performance of the first NO$_x$ reduction control permitted when an engine load is within a predetermined medium load range equal to or higher than a first predetermined engine load but lower than a second predetermined engine load,
wherein the SCR catalyst purifies NO$_x$ within an engine operating range where the NO$_x$ reduction controlling module does not perform the post injection by the fuel injector to reduce the stored NO$_x$.

2. The system of claim 1, wherein the NO$_x$ reduction controlling module permits the performance of the first NO$_x$ reduction control when an engine speed is within a medium speed range.

3. The system of claim 2, wherein when a temperature of the NO$_x$ catalyst is above a given value, the NO$_x$ reduction controlling module expands the medium speed range toward a higher speed side by raising a speed value defining a higher end of the medium speed range.

4. The system of claim 2, wherein when the NO$_x$ stored amount is above a given value, the NO$_x$ reduction controlling module expands the medium speed range toward a higher speed side by raising a speed value defining a higher end of the medium speed range.

5. The system of claim 1, wherein the NO$_x$ reduction controlling module suspends the first NO$_x$ reduction control when the engine load moves outside the medium load range, and resumes the first NO$_x$ reduction control when the engine load re-enters the medium load range so that a $NO_x$ stored amount falls below the given amount.

6. The system of claim 1, wherein when a temperature of the $NO_x$ catalyst is above a given value, the $NO_x$ reduction controlling module expands the medium load range toward a higher load side by raising a load value defining a higher end of the medium load range.

7. The system of claim 1, wherein when the $NO_x$ stored amount is above a given value, the $NO_x$ reduction controlling module expands the medium load range toward a higher load side by raising a load value defining a higher end of the medium load range.

8. The system of claim 1, wherein when the $NO_x$ stored amount in the $NO_x$ catalyst is below the determination amount and the air-fuel ratio becomes rich due to acceleration of a vehicle, the $NO_x$ reduction controlling module also performs a second $NO_x$ reduction control in which the fuel injector performs the post injection to temporarily control the air-fuel ratio to the target air-fuel ratio so that the $NO_x$ stored in the $NO_x$ catalyst is reduced, the post injection causing the injected fuel to be discharged to the exhaust passage as unburned fuel without being combusted inside the cylinder, the performance of the second $NO_x$ reduction control permitted only when the engine load is within a high load range above a load defining a higher end of the medium load range.

* * * * *